United States Patent
Henry et al.

(10) Patent No.: US 11,849,344 B2
(45) Date of Patent: Dec. 19, 2023

(54) DYNAMIC MEDIA ACCESS CONTROL ADDRESSES IN A WIRELESS NETWORK

(71) Applicant: Cisco Technology, Inc., San Jose, CA (US)

(72) Inventors: Jerome Henry, Pittsboro, NC (US); Nancy Cam-Winget, Mountain View, CA (US); Simone Arena, Lombardia (IT); Darrin Joseph Miller, Marysville, OH (US); Sudhir Kumar Jain, Fremont, CA (US); Einar Nilsen-Nygaard, Waterside Kilmarnock (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/236,659

(22) Filed: Apr. 21, 2021

(65) Prior Publication Data
US 2021/0360465 A1 Nov. 18, 2021

Related U.S. Application Data

(60) Provisional application No. 63/025,272, filed on May 15, 2020.

(51) Int. Cl.
*H04W 28/02* (2009.01)
*H04W 8/24* (2009.01)
*H04W 28/086* (2023.01)

(52) U.S. Cl.
CPC ....... *H04W 28/0205* (2013.01); *H04W 8/245* (2013.01); *H04W 28/0215* (2013.01); *H04W 28/086* (2023.05)

(58) Field of Classification Search
CPC ... H04L 63/162; H04L 61/2053; H04L 61/25; H04L 61/6022; H04W 28/0205;
(Continued)

(56) References Cited

U.S. PATENT DOCUMENTS 6,618,757 B1 * 9/2003 Babbitt ............... H04L 61/5014
709/227
8,745,253 B2 * 6/2014 Absillis ............... H04L 63/162
709/228
(Continued)

FOREIGN PATENT DOCUMENTS

DE 102015204210 A1 9/2016
EP 1379029 A1 1/2004
(Continued)

OTHER PUBLICATIONS

Ansley et al., "Proposal for New Action Frame to Aid Mac Randomization Handling," IEEE 802.11-19/0179r3, Jul. 2019, 9 pages.
(Continued)

*Primary Examiner* — Stephen J Clawson
(74) *Attorney, Agent, or Firm* — Edell, Shapiro & Finnan, LLC

(57) ABSTRACT

Embodiments identify a station that rotates an over the air station address. As address rotation was not originally designed into wireless networks, the rotation can introduce communication challenges for the station. The embodiments derive that traffic referencing two different over the air station addresses are associated with a single common station. This is accomplished by determining a similarity between properties of two sets of traffic. A first set of traffic references the first over the air station address and a second set of traffic references the second over the air station address. If the properties common across the two sets of traffic indicate sufficient similarity, the embodiments determine that both sets of traffic are associated with a single device. Network configuration of the device is then adjusted based on the determination.

20 Claims, 25 Drawing Sheets

(58) Field of Classification Search
CPC ......... H04W 28/0215; H04W 28/0804; H04W 8/245; H04W 84/12
See application file for complete search history.

(56) References Cited

U.S. PATENT DOCUMENTS

| | | | |
|---|---|---|---|
| 10,237,738 B2 | 3/2019 | Lee et al. | |
| 10,454,887 B2 | 10/2019 | Weis et al. | |
| 10,820,202 B1 | 10/2020 | Gundavelli | |
| 2005/0105529 A1* | 5/2005 | Arberg | H04L 29/12273 370/395.5 |
| 2008/0232298 A1* | 9/2008 | Kim | H04L 61/2015 370/320 |
| 2009/0092099 A1* | 4/2009 | Gu | H04L 12/66 370/331 |
| 2010/0186030 A1* | 7/2010 | Yun | H04H 20/82 725/33 |
| 2012/0213211 A1 | 8/2012 | Remaker | |
| 2014/0341182 A1* | 11/2014 | Gage | H04W 12/06 455/411 |
| 2016/0135041 A1* | 5/2016 | Lee | H04L 61/2596 726/3 |
| 2016/0269359 A1* | 9/2016 | Adrangi | H04L 61/2092 |
| 2017/0142064 A1 | 5/2017 | Weis et al. | |
| 2018/0375988 A1* | 12/2018 | Xu | G06F 3/01 |
| 2020/0244655 A1 | 7/2020 | Gundavelli et al. | |

FOREIGN PATENT DOCUMENTS

| | | |
|---|---|---|
| EP | 1732265 A1 | 12/2006 |
| WO | 2016/114843 A2 | 7/2016 |
| WO | 2020000430 A1 | 1/2020 |

OTHER PUBLICATIONS

Marks, "IEEE Std 802c: What's New and Useful in the Overview and Architecture," IEEE 802.1 Contribution, Sep. 2017, 42 pages.

Slashdot, "Did MacOS Stop Allowing Changes to Wifi MAC Addresses?," https://mobile.slashdot.org/story/10/06/177216/did-macos-stop-allowing-changes-to-wifi-mac addresses, Apr. 5, 2021, 8 pages.

Volz, et al., "Link-Layer Addresses Assignment Mechanism for DHCPv6," draft-bvtm-dhc-mac-assign-02, Dynamic Host Configuration (DHC), Internet-Draft, Oct. 20, 2018, 18 pages.

Lee, et al., "Problem Statements for MAC Address Randomization," draft-lee-randomized-macaddr-ps-01 Internet Engineering Task Force, Internet-Draft, Sep. 22, 2020, 6 pages.

Ansley, "IEEE P802.11—Randomized and Changing Mac Address (RCM) Study Group (SG)—Meeting Update," https://www.ieee802.org/11/Reports/rcmtig_update.htm, Apr. 5, 2021, 2 pages.

Stretch, "MAC Address Aggregation and Translation as an Alternative to L2 Overlays," https://packetlife.net/blog/2014/nov/18/mac-address-aggregation-and-translation/, Nov. 18, 2014, 9 pages.

Wang, et al., "MAC Address Translation for Enabling Scalable Virtual Private LAN Services?," 21st International Conference on Advanced Information Networking and Applications Workshops (AINAW'07), May 2007, 6 pages.

Android Open Source Project, "Privacy: MAC Randomization," retrieved from https://source.android.com/devices/tech/connect/wifi-mac-randomization, on Dec. 4, 2020, 4 pages.

Bellovin et al., "Privacy-Enhanced Searches Using Encrypted Bloom Filters," Columbia University Computer Science Technical Reports, CUCS-034-07, Apr. 27, 2011, 16 pages.

Razaque, et al., "Restoring the privacy and confidentiality of users over Mobile collaborative learning (MCL) environment," IEEE Transaction Latin America, vol. 9, No. 7, Dec. 2011, 13 pages.

Alibaba Cloud, "The principle of Arp-nat (MAC Address translation)," https://topic.alibabacloud.com/a/the-principle-of-arp-nat-mac-address-translation_8_8_30147619.html, Nov. 2017, 7 pages.

Wi-Fi Alliance, "WPA3™ Specification," Version 3, WPA3™ Specification Version 3.0, https://www.wi-fi.org/file/wpa3-specification, Dec. 20, 2019, 30 pages.

International Search Report and Written Opinion in counterpart International Application No. PCT/US2021/031684, dated Jul. 5, 2021, 16 pages.

Frank Ciotti, et al., "TGi Dallas Interim Meeting Minutes—Jan. 2002," LinCom Wireless, Wireless LANs, doc.: IEEE 802.11-02/028r0, Jan. 21-25, 2002, 34 pages.

"Amendment 2: Local Medium Access Control (MAC) Address Usage," IEEE Standards Association, IEEE Standard for Local and Metropolitan Area Networks: Overview and Architecture, IEEE Std 802c™-2017, 26 pages.

"Part 11: Wireless LAN Medium Access Control (MAC) and Physical Layer (PHY) specifications—Amendment 6: Medium Access Control (MAC) Security Enhancements," IEEE Standard for Information technology—Telecommunications and information exchange between systems—Local and metropolitan area networks—Specific requirements, IEEE Std 802.11i™-2004, Jul. 23, 2004, 190 pages.

\* cited by examiner

DYNAMIC MEDIA ACCESS CONTROL ADDRESSES IN A WIRELESS NETWORK

CROSS REFERENCE TO RELATED APPLICATIONS

This application claims priority to U.S. Provisional Patent Application No. 62/025,272, filed May 15, 2020 and entitled "Stable Infrastructure Layer 2 (L2) Representation for Rotating Media Access Control (MAC) Addresses." The contents of this prior application are considered part of this application, and are hereby incorporated by reference in their entirety.

TECHNICAL FIELD

The present disclosure relates to communication over wireless networks, such as wireless networks that include wireless stations and access point.

BACKGROUND

Wireless terminals (WTs) or stations (STAs) communicate with an access point via a station address that uniquely identifies the STA on a wireless medium. As security concerns around the wireless networks have increased, many wireless protocols used over wireless networks are accomplished using secure communications. These secure protocols make it increasingly difficult for nefarious actors to gain information based on wireless communications. Wireless terminals are identified on a wireless medium by a station address. The station address uniquely identifies a STA. Thus, when an access point seeks to communicate with a STA, it includes the STA's station address in the communications. Since the STA uniquely identifies a station, it also provides an opportunity for a nefarious actor to gain some information about the wireless station. For example, based on the station address that identifies the station, a nefarious actor can understand the frequency and amount of communication by the station. The nefarious actor is also able to understand timing of any communication. Furthermore, if the station moves from one location to a second location, while maintaining a common station address, the nefarious actor might also be able to obtain visibility into movement patterns of the STA, and thus, movement patterns associated with its respective user.

DESCRIPTION OF EXAMPLE EMBODIMENTS

Overview

Figure 1A:
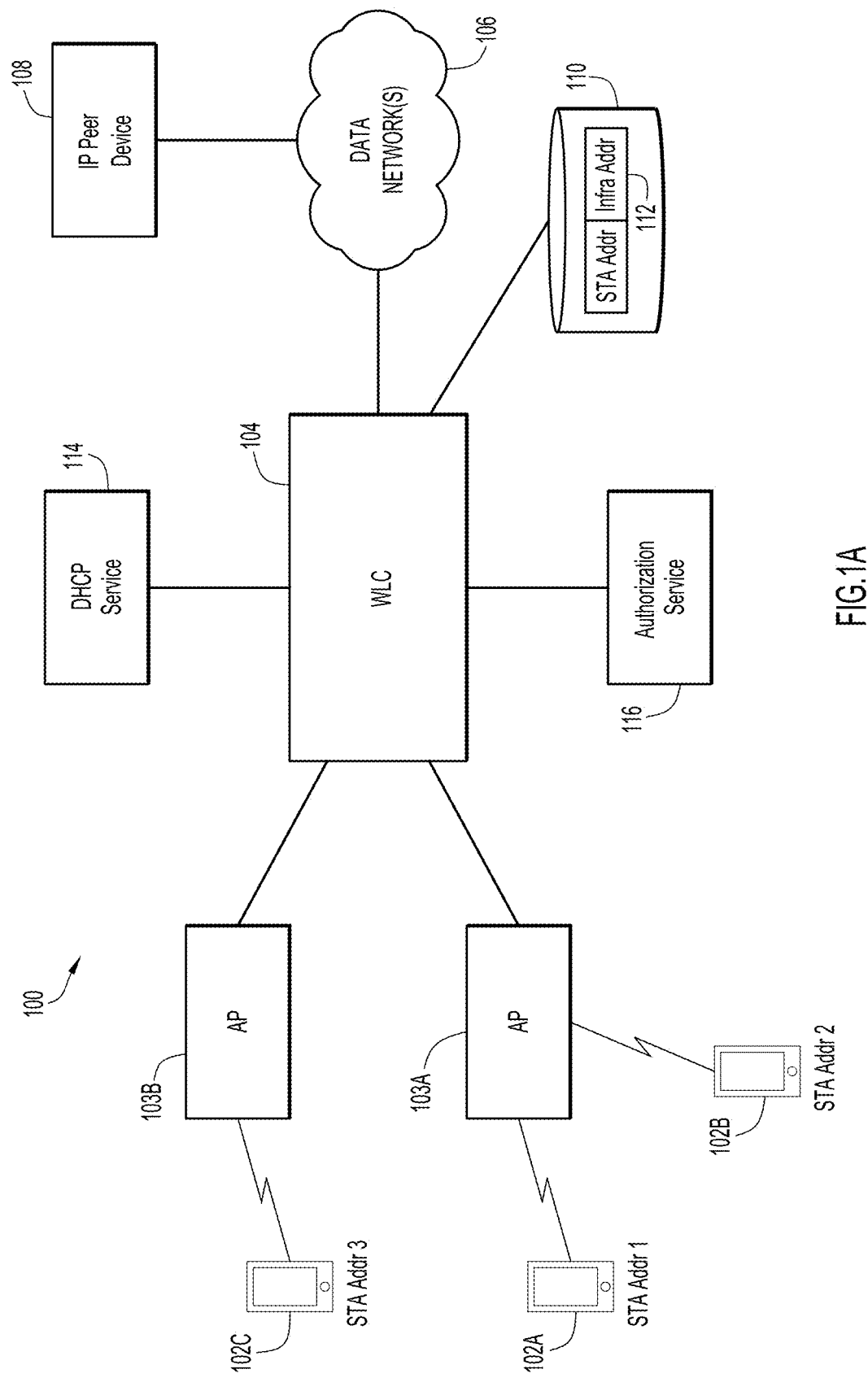
FIG. 1A is an overview diagram of a system implementing at least one of the disclosed embodiments.

In one form, a computer-implemented method is provided. The method includes obtaining a first wireless communication that references a first station address. First properties associated with the first station address are identified based on the first wireless communication. A second wireless communication that references a second station address is also obtained, and second properties referenced by the second wireless communication are also identified. One or more common properties between the first wireless communication and the second wireless communication are then determined. An indication of whether the first station address and the second station address identify a common station are then determined based on the one or more common properties. Some embodiments associate a weight with each of the one or more common properties, and a similarity score is determined based on a weighted sum of the common properties. Network parameters of a station (e.g., a station identified via the second station address) are then configured based on the determination. For example, in some embodiments, a mapping between the STAs station address and an infrastructure station address is determined based on whether the two station addresses identify a common station.

Examples Embodiments

To improve user privacy associated with wireless communications, wireless client devices (herein called "stations" or STAs) are beginning to modify or rotate their station address (e.g., a media access control (MAC) address) during communications on a wireless network. While this can make it more difficult for an eavesdropper to track activity of a particular station, it also presents challenges for network infrastructure to support existing network services. For example, a station, in some embodiments, modifies its MAC station address but maintains existing IP based sessions or communications with a remote device. Under these circumstances, there is a need for the network infrastructure to ensure the IP address in use by the station is properly remapped to the new modified MAC station address.

Presented herein are embodiments that maintain a mapping between a MAC station address used by a station for wireless communications (e.g., an "over the air" (OTA) station address), and a station address that identifies the station to devices not on the wireless network (e.g. an infrastructure station address). For example, a wireless local area network (LAN) controller (WLC), in some embodiments, translates between the OTA station address of a station and its corresponding infrastructure station address as the station exchanges messages with a remote device. For example, a message transmitted by the station includes the OTA station address as a source address in a header of the message. Upon receiving the message, the WLC exchanges the OTA station address of the station in the source address field for a corresponding infrastructure station address that represents the station to devices reachable via a second network, but not on the wireless network. The WLC then forwards the modified message over the second network. When packets that are destined for the station are received from the second network, the WLC replaces the infrastructure station address located in a destination address field of the received message with the OTA station address. The WLC then forwards the message for transmission on the wireless network (e.g. in some cases, via an AP controlled by the WLC). In one example, the wireless network is an IEEE 802.11 wireless network, known commercially as a Wi-Fi® network. However, the techniques presented herein are not limited to any particular wireless communication standard or technology.

This mapping between OTA station addresses and infrastructure station addresses is adjusted, in some embodiments, when the station rotates its MAC station address. For example, in cases where the station seeks to preserve layer 3 or higher communications despite the rotation, the disclosed embodiments preserve addressing information representing the station on the second network by mapping the new second OTA station address to the previously used infrastructure station address.

Before appropriate mappings between the new OTA station address and other addresses can be updated, an indication of a probable reuse of services by a STA with the new OTA station address is determined. In some cases, the MAC address rotation signals a clean reengagement with the wireless network, with no services being preserved across the rotation. In other cases, the station attempts to maintain services despite the change in MAC addresses. The disclosed embodiments make this determination without explicit indications from the station as to how many or which services will be reused. Instead, the disclosed embodiments derive the stations reuse of network services based on the station's behavior on the network. For example, in some embodiments, properties of a station's network communication with a new OTA station address, such as resources accessed, encryption keys referenced, or other properties, are compared to those properties accessed prior to the address rotation. Depending on whether the common properties between the two sets of traffic exhibit sufficient similarity, the mapping of the OTA station address and/or IP address to an infrastructure station address are adjusted as appropriate. Details of this approach are described further below.

As explained above, in some cases, a STA changes its MAC address while communicating with one or more network services (e.g. such as a dynamic host configuration protocol (DHCP) service). This modification of a MAC address introduces at least some chance that communications of the STA that rely on the wireless network infrastructure will be disrupted. Such communications at risk include, but are not limited to:

A Dynamic Host Configuration Protocol (DHCP) service—Modification of a MAC address can cause a DHCP service to receive requests from two different MAC addresses for a common IP address. Additionally, DHCP scope depletion is also more likely to occur in such environments when a STA rotates its station address and requests a new IP address. However, a mapping between a previous IP address and previous station address persists for some time. Thus, the previous IP address is unavailable for use until a lease times-out, despite allocation of the new IP address to the STA.

Authentication, Authorization and Accounting (AAA) services are at risk of becoming overloaded, as the additional station address modifications cause new authentications with each modification.

A Switch Content Addressable Memory (CAM) table can become exhausted based on obsolete MAC addresses preventing traffic forwarding.

Thus, a wireless network environment experiencing MAC rotation or modification by stations can benefit if a MAC address expressed to infrastructure services remains stable despite the dynamic nature of over the air (OTA) MAC addresses used to identify stations on the wireless network itself. Such a solution provides for privacy of station identity, while maintaining station unity from the infrastructure perspective, such that services expected by the station and its user continue uninterrupted despite the MAC address rotation.

FIG. 1A is an overview diagram of a system 100 implementing at least one of the disclosed embodiments. FIG. 1A shows a wireless station (STA) 102A that is in communication with an access point (AP) 103A. The AP 103A is in communication with a wireless LAN controller (WLC) 104. The WLC 104 is also in communication with an AP 103B. The WLC 104 maintains, in a data store 110, a mapping 112 between one or more "over the air" station address of stations used for communication with one of the AP 103A and/or AP 103B, and an infrastructure station address that identifies a station to other devices accessible via a data network 106, such as an IP peer device 108. Thus, for example, a first station address used by the STA 102A to communicate wirelessly with the AP 103A (e.g., an "over the air" station address), is generally different from an infrastructure station address that identifies the STA 102A to the IP peer device 108.

As discussed above, to improve network security of the STA 102A, the STA 102A, from time-to-time, modifies its OTA station address used to communicate with the AP 103B. This modification of a station address is represented in FIG. 1A via STA 102B and STA 102C. While both STA 102B and STA 102C represent the same station as the STA 102A, they are provided in FIG. 1A to show that the same station utilizes, in some embodiments, at least one other station address. In FIG. 1, the same physical station is shown utilizing three different over the air station addresses, represented by the STA 102A (utilizing a first OTA station address), STA 102B (utilizing a second OTA station address), and STA 102C (utilizing a third OTA station address).

To the extent that the station seeks to maintain existing communications with other devices accessible via the data networks 106 when it modifies its OTA station address (e.g., such as the IP peer device 108), the WLC 104 is configured to map both the first station address, and the modified station address (e.g. a second station address) to a single infrastructure (station) address that identifies the station to other devices accessible via the data network 106, such as the IP peer device 108.

In some embodiments, the WLC 104 also facilitates release or renewal of an IP address of a station by interfacing with a dynamic host control protocol (DHCP) service 114. For example, in some embodiments, if the WLC 104 detects that a station is not going to reuse an IP address, the WLC 104 issues, in some embodiments, a release command to the DHCP service 114 for the IP address. Similarly, if the WLC 104 determines a station is modifying its OTA station address but plans to reuse an existing IP address previously allocated to the station, the WLC 104 generates requests to the DHCP service 114 to map the new modified station address to the existing IP address.

In some embodiments, the station reuses authentication information when it modifies a station address from a first OTA station address. For example, in some embodiments, the station establishes a primary master key identifier when associated with an access point, such as AP 103A. This primary master key identifier is allocated to the station by an authentication/authorization service 116. As it can be undesirable to re-authenticate the station upon a modification of the station's OTA station address, the station, in some circumstances, attempts authentication using the previously provided primary master key identifier. In some embodiments, the WLC 104 detects the attempt to reuse the PMK ID and, after the station successfully completes an authentication using the same PMK ID, determines that the station having the modified station address is the same station that previously relied on the first OTA station address. Based on this determination, the WLC 104 updates the mapping 112 to maintain a consistent infrastructure station address for the station.

Figure 1B:
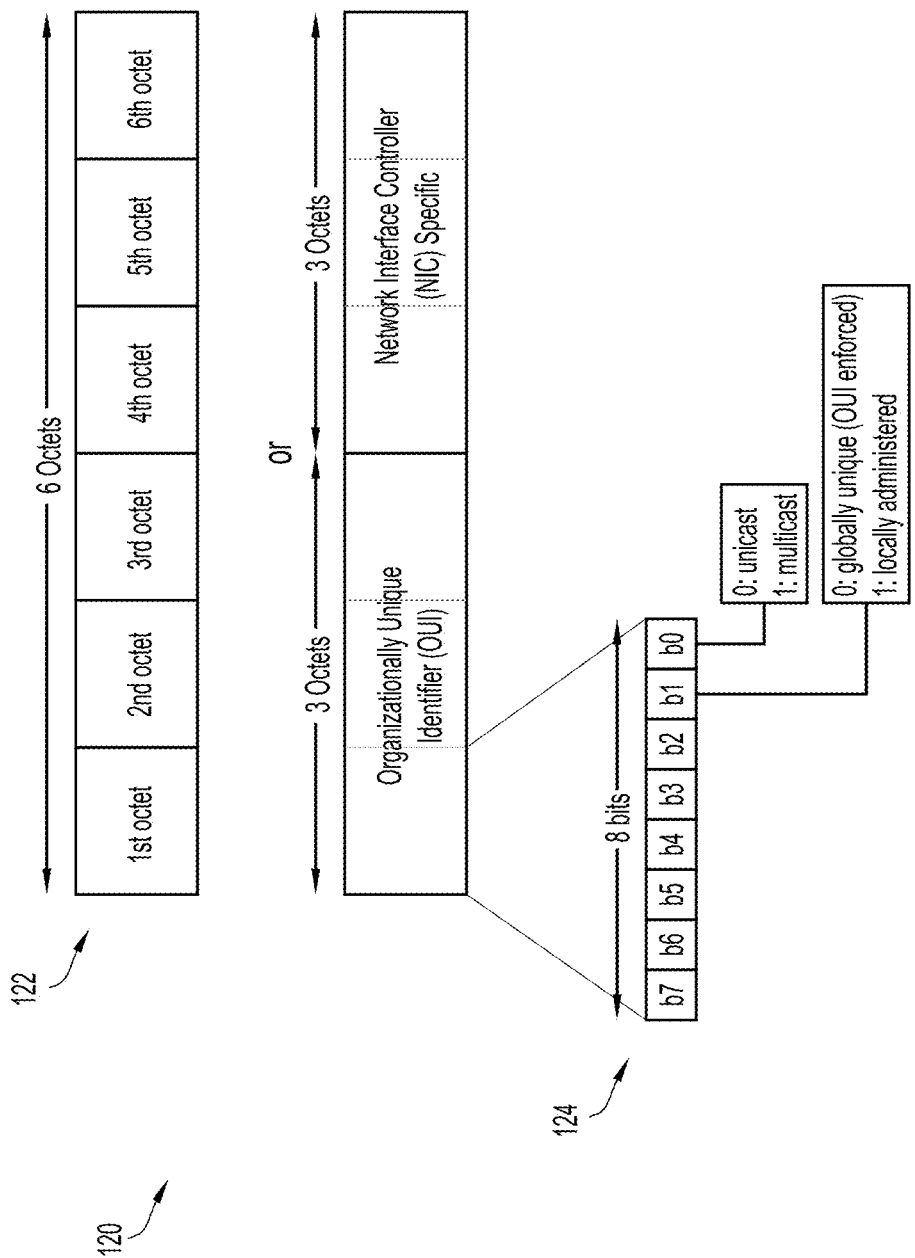
FIGS. 1B and 1C are diagrams depicting a local administered (i.e., 'randomized') MAC address scheme, according to an example embodiment.
Figure 1C:
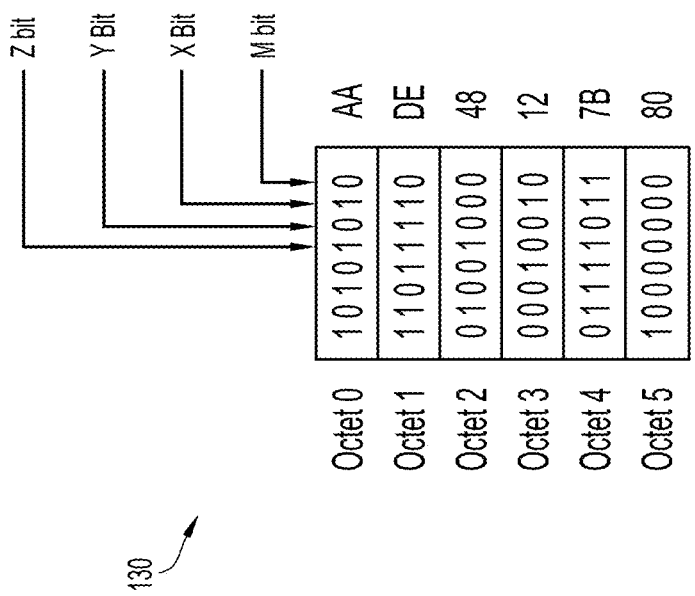

FIG. 1B and FIG. 1C illustrate an example bit allocation in an IEEE 802.11 station address that is utilized in at least some of the disclosed embodiments. The example bit allocation 120 illustrates a station address 122 that includes six octets. A high order octet 124 includes eight bits as shown. As is readily observable in the bit allocation 130 of FIG. 1C, a low order bit of the eight bits indicates whether the station address is a unicast (bit is clear) or a multicast frame (the low order bit is clear). A bit b1 indicates whether the station address 122 is a globally unique address (b1 is clear) or is locally administered (b1 set). The bit b3 is considered a "Y" bit and bit b2 is considered a "Z" bit. Allocations of the "Y" and "Z" bits defines a structured local address plan optional specification for localized media access control addresses (MACs) (this reduces the chance of MAC collisions):

YZ (ZYXM): 01 (101→A) Extended Local Identifier (ELI)
   Self-assigned (similar to an extended unique identifier (EUI))
YZ (ZYXM): 11 (1110→E) Standard Assigned Identifier (SAI)
   Assigned by a protocol (e.g. P802.1CQ)
YZ (ZYXM): 00 (0010→2) Administratively Assigned Identifier (AAI)
   Assigned by network administrator
YZ (ZYXM): 10 (0110→6) Reserved During an association process, a STA source address (SA) is observed. A STA using a locally administered MAC address generally sets the second bit (b1) (a clear bit indicates a globally unique, i.e. an organizationally unique identifier (OUI)-enforced address). Generally, a STA does not use a globally unique pool of station addresses when rotating its MAC address (i.e. 'globally unique' is congruent to 'permanent representation of the STA'). Thus, STAs that set the b1 bit to zero are known to use a real, permanent address.

When a STA sets the b1 bit to 1, a locally administered address is identified. Bits 3 and 4 (Y and Z bits) are examined, to validate whether the STA uses a Structured Local Address Plan (SLAP), with the Extended Local Identifier (ELI mode, SLAP value to 01). In this case, the manufacturer may be identified with stability. If the bits are set to self-assigned (SAI, 11) Administratively Assigned Identifier (AAI, 00), or the Reserved value (10), the generation process is recorded as being local and does not provide information on the STA vendor or manufacturer.

The ELI value is only an indication that the STA may use SLAP. The bits may also be the result of a STA assigning bits randomly. This record is solidified in (X) below.

When the STA is identified to use a randomized MAC address (called OTA-MAC), a WLC limits, in some embodiments, the scope of the STA random address (OTA-MAC) to the wireless space. As such, at association time, the WLC generates another locally administered address (called infra-MAC). The generated MAC can either be ELI, or a SAI/AAI. The WLC then uses Address Resolution Protocol (ARP) to query the presence of that MAC address on the local segment. In some embodiments, the WLC queries the gateway for the infra-MAC address presence.

In yet other embodiments, the WLC sends a Neighbor Solicitation (NS) message to an IPv6 link local address generated from the infra-MAC address. Other methods may also be used, in some embodiments, to ensure that the MAC address generated by the WLC is not already in use in the intended STA subnet.

Once the WLC confirms the generated MAC address is not already in use, the WLC assigns that infra-MAC address to the STA and creates an entry mapping the MAC address generated by the STA (OTA-MAC) and the MAC address generated by the WLC for that STA (infra-MAC).

The WLC may accomplish these processes in advance, so as to speed up the association phase. A simple algorithm can be used to measure the average association peak, and pre-allocate a matching number of infra-MACs accordingly.

The collision space is sparse. Therefore, in another embodiment, the verification step is skipped and the infrastructure MAC address is directly assigned without further verification, counting on the low probability for the collision to happen. However, this mode may be less desirable.

The WLC uses the infra-MAC address to express the STA identity to the network infrastructure (e.g., to AAA, DHCP, or a gateway) In Extensible Authentication Protocol (EAP) operations allowed in 802.11 (e.g., EAP-Protected Extensible Authentication Protocol (EAP-PEAP), EAP-Transport Layer Security (EAP-TLS), EAP-Flexible Authentication via Secure Tunneling (EAP-FAST), EAP-Tunneled Transport Layer Security (EAP-TTLS)), the AAA/Master Session Key (MSK) derivation depends on the supplicant identity, but not on the supplicant machine MAC address. As such, the WLC uses the infra-MAC address to represent the STA transparently to the infrastructure. Then, the WLC uses the OTA-MAC address to communicate (e.g., via a DHCP lease) with the STA.

Figure 1D:
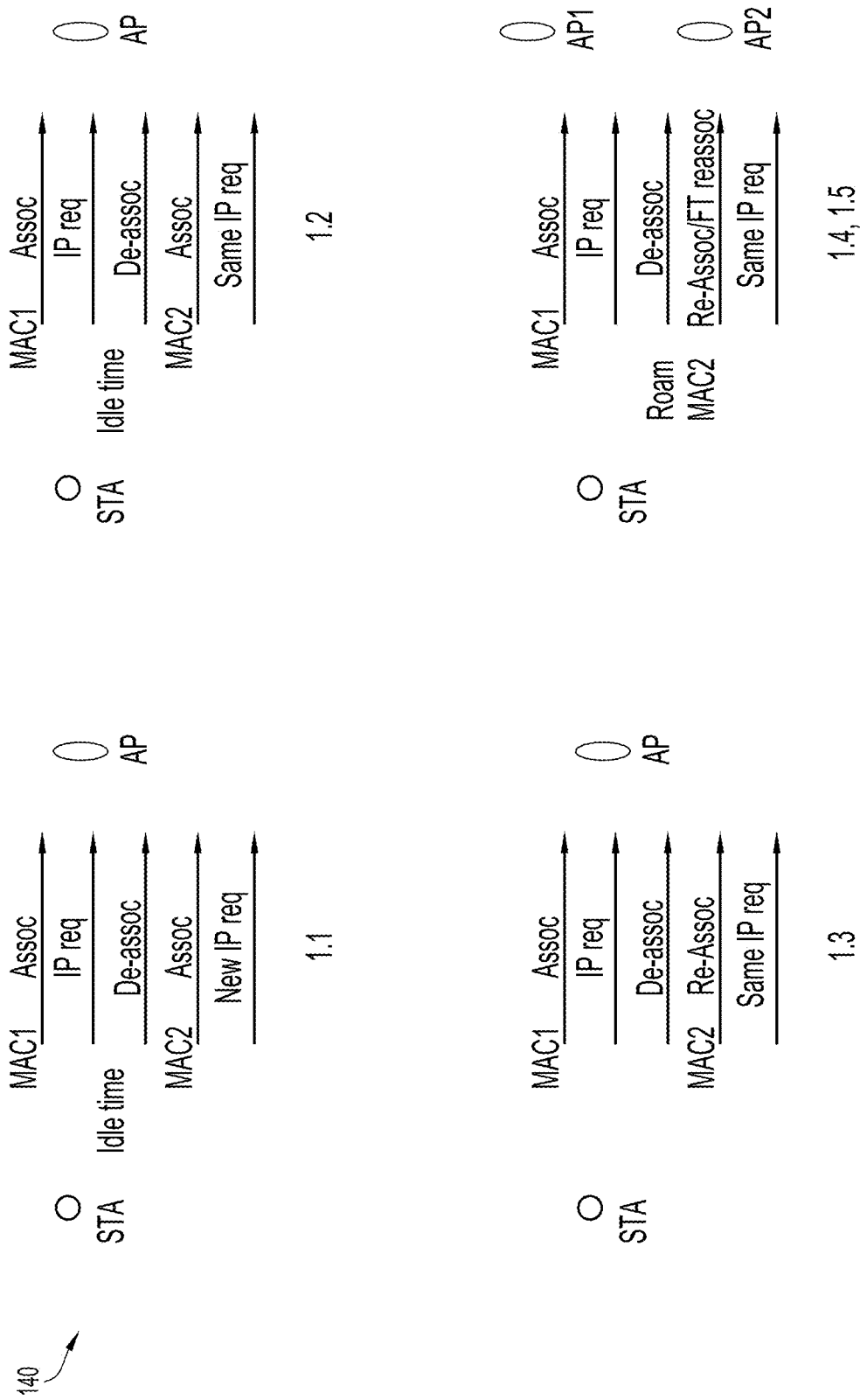
FIGS. 1D-1F illustrate examples of MAC address rotation behavior of a station while maintaining a session, according to at least one example embodiment.

FIG. 1D illustrates one embodiment of MAC address rotation 140. During a session, a STA rotates or otherwise modifies its OTA-MAC address. Several use cases are considered by the disclosed embodiments to ensure proper operation. At least some of those use cases are described below:

1.1. The STA takes advantage of an idle period (e.g., no open sockets, STA idle for more than X seconds, and/or the STA proactively terminates any upper layer sessions (e.g., releases any IP addresses, terminates TCP connections, etc.), and sends a disassociation message, then performs a new association process with the AP with a new OTA-MAC address. From the infrastructure standpoint, this event is a session termination, no action is needed (OTA-MAC address and infra-MAC address are flushed and the STA is removed). As no session continuity is needed, the new OTA-MAC address appears as a new STA.

Figure 1E:
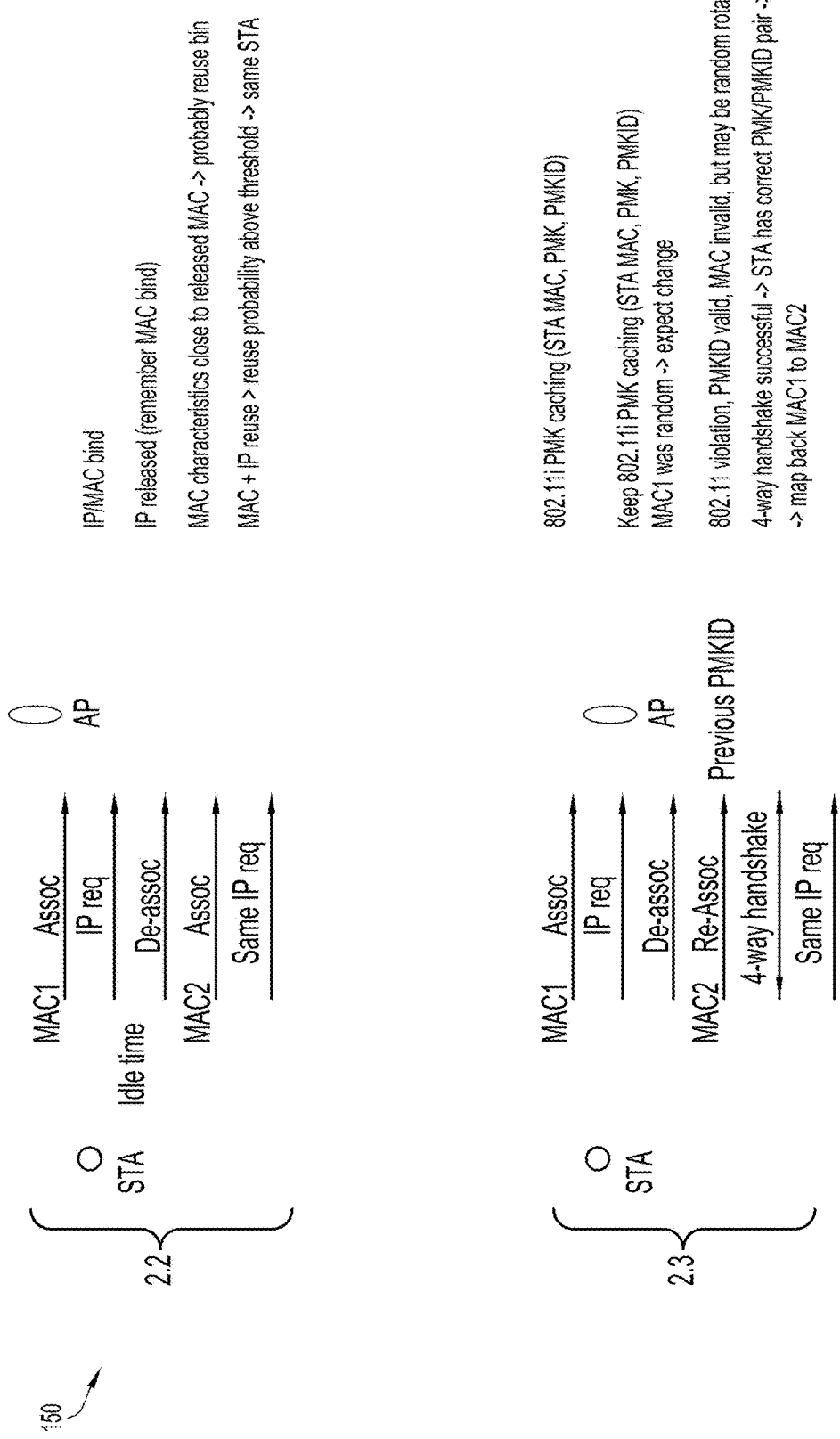

1.2. In a variation from 1.1, the STA, with the new OTA-MAC address, attempts to reuse the same higher layer resources (e.g., same IP address). In this case, session continuation is needed for L3 and up (but L2 can undertake a new authentication). To resolve ambiguity introduced by MAC address rotation under these circumstances, some of the disclosed embodiments provide the following solutions:
  a. FIG. 1E shows a message sequence labeled 2.2 that includes methods implemented to free upper layer assigned resources (e.g. DHCP release, then DHCP Discover/Request for the same IP address; and/or, gratuitous ARP replies to map the new OTA-MAC to the same IP address).
  b. Using a snooping function on the WLC, OTA-MAC addresses are recorded, releasing L3 resources.
  c. When such release happens, the current OTA-MAC address capabilities (expressed in probe and association requests, and containing Vendor Specific Information Elements (VSIEs) and STA L2 profile) are stored.
  d. Then, when a new OTA-MAC address associates, the L2 capability elements are observed and the new OTA-MAC address is positioned in a probable-reuse bin (if L2 characteristics are similar to a previous one). If capabilities are identical to a previous OTA-MAC address and requests the same resources released by the previous OTA-MAC address, the new OTA-MAC address is determined to be the same as the previous one and the entries are unified/correlated, and the same infra-MAC address is used when forwarding these resource requests to the wired network.

1.3. The (temporarily idle) STA sends a disassociation frame or message to the current AP, and a re-association message to that same AP using the new OTA-MAC address. For this case, session continuation is needed. To resolve ambiguity in the message sequence labeled 2.3 in FIG. 1E, introduced by address rotation in this use case, per 802.11i, PMK caching is implemented. Additionally, when sending a re-association message, the STA mentions the Pairwise Master Key Identifier (PMKID) in the re-association exchange. Thus, when the STA sends the disassociation message, the PMK is stored, along with the OTA-MAC address and PMKID for the same duration (so as to maintain mapping between these elements, instead of flushing these elements immediately).

Then, when a new OTA-MAC address requests the same PMKID, the L2 capability elements are observed and the new OTA-MAC address is positioned in a probable-reuse bin. If the 4-way handshake completes successfully, it is concluded that the new OTA-MAC is the same as the previous one and the entries are unified.

FIG. 1E shows another embodiment of MAC address rotation 150. In particular, FIG. 1E is directed to use of Fast-Transition (FT) techniques when a STA moves from one AP to another AP. During the roaming process, the STA rotates the OTA-MAC address.

Figure 1F:
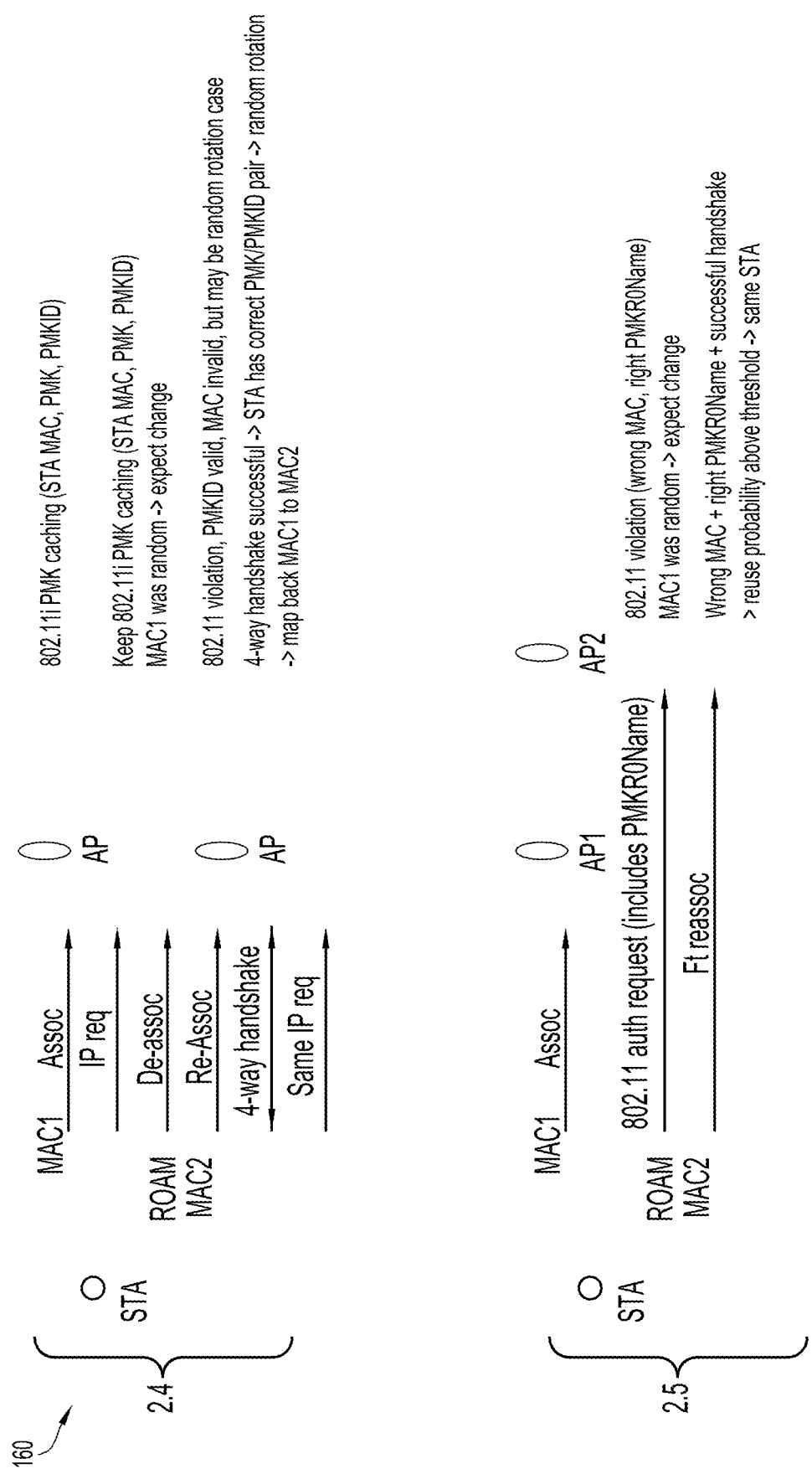

FIG. 1F shows still another embodiment of MAC address rotation 160. Specifically, at roaming time, the STA rotates the OTA-MAC address (re-association to the next AP with the new OTA-MAC). Session continuation is needed. Solutions for the use case of FIG. 1F are similar to those of FIG. 1E. Message sequence labeled 2.4 in FIG. 1F illustrates that a re-association is sent to a different AP than the disassociation message (which is irrelevant in a WLC-based solution), and that the re-association message is expected to be sent a few hundreds of milliseconds after the disassociation (while in 1.3, the re-association can occur any time within a 60-minute cache window mechanism defined by 802.11i).

FIG. 1F shows MAC address rotation by a station while the station re-uses a pairwise master key information and an IP address. In the message sequence labeled 2.5 in FIG. 1F, a station utilizes 802.11 FT techniques to re-associate with an access point. With the FT message sequence, the station re-presents the PMKR0. Alternatively, the STA may use the FT re-association request to the new AP (to switch to the new OTA-MAC address). In both cases, the PMKR0Name/PMKR1Name is identified as common between traffic indicating the pre-rotation station address and traffic indicating the post-rotation station address. As the handshake with the new AP completes, the new OTA-MAC is determined to identify a common STA as the previous OTA-MAC address.

In some embodiments, at a WLC, the STA identifier is stored as the infra-MAC address (instead of the OTA-MAC address), thus allowing L2 identifier stability for the STA (from the trusted infrastructure standpoint), while allowing the STA to increase privacy protection (from eavesdroppers) by rotating its MAC address over-the-air.

Figure 2:
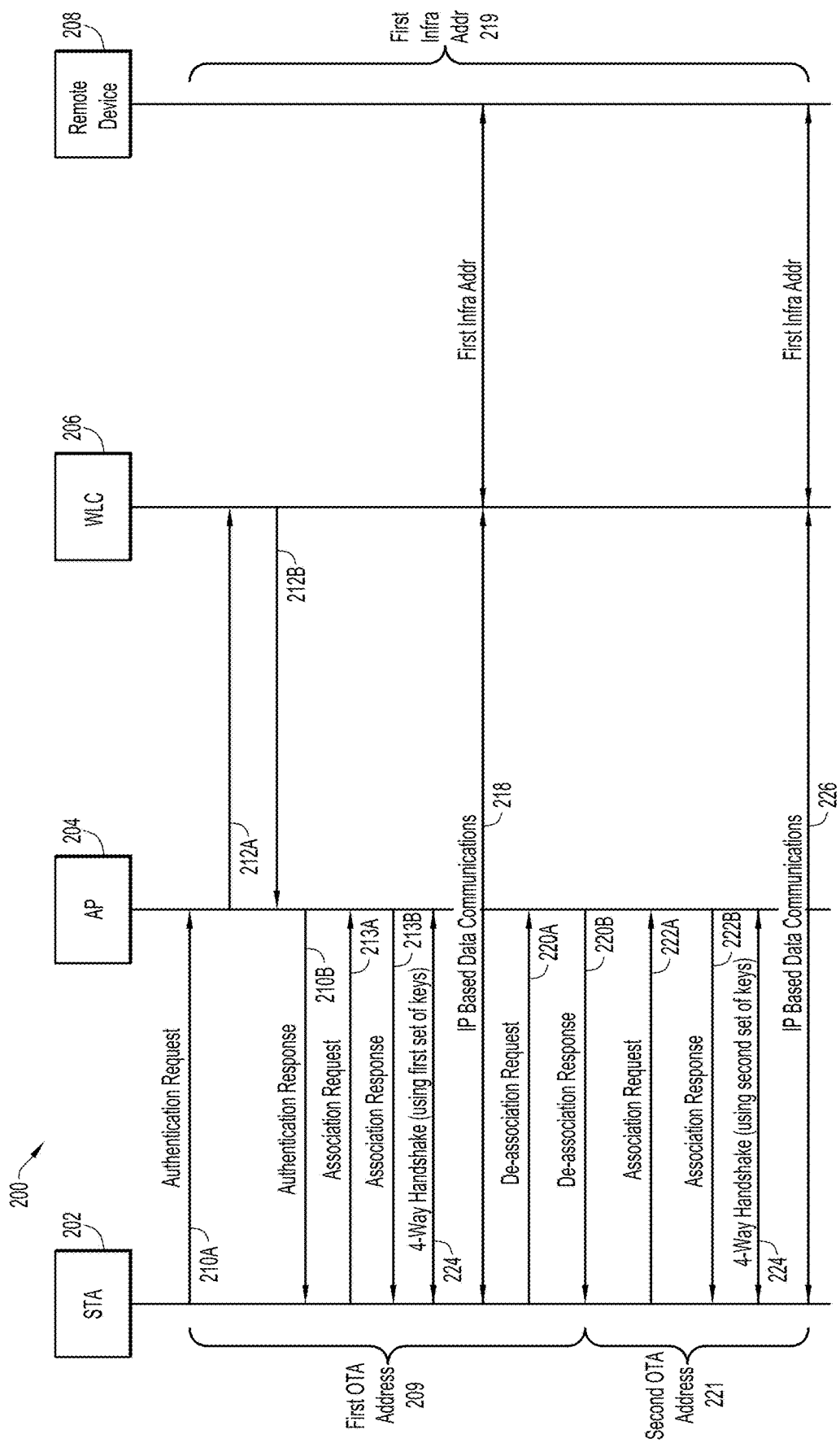
FIG. 2 is a sequence diagram illustrating example message flows between a wireless station and wireless infrastructure components.

FIG. 2 is a sequence diagram 200 illustrating example message flows between a wireless station and wireless infrastructure components. FIG. 2 shows a station (also called a wireless terminal) 202, AP 204, WLC 206, and a remote device 208. The STA 202 sends an authentication request 210A to the access point 204. To accomplish the authentication, the AP 204 performs an authentication exchange including message 212A and reply 212B with the WLC 206. In some cases, the WLC 206 interacts with an authentication and authorization service to accomplish the authentication on behalf of the AP 204. Depending on the results of the authentication, the AP 204 sends an authentication response message 210B to the STA 202. The STA 202 then performs an association message exchange including an association request 213A send from the STA 202 to the AP 204, and an association response message 213B sent by the AP 204 to the STA 202. As part of the association message exchange, the AP 204 assigns an association identifier to the STA 202 for use during communications between the STA 202 and the AP 204. The association message exchange (e.g., specifically the association response message 213B) also provides the STA 202 with a pairwise master key (PMK) for communication on the wireless network.

Based on the PMK obtained during association, the STA 202 performs a 4-way handshake 216 with the AP 204 to successfully establish secure communications with the AP 204. After successful completion of the 4-way handshake 216, the STA 202 performs communications with the remote device 208, whose address is obtained by the STA 202 from a DHCP service (not shown). These IP address-based communications are shown as data communications 218 in FIG. 2.

To provide for routing of data between the STA 202 and the remote device 208, the WLC 206 maps a first OTA station address 209 of the STA 202 to a first infrastructure station address 219. Thus, when the STA 202 transmits a packet to the remote device 208, the WLC 206 substitutes the first infrastructure station address 219 for the first OTA station address 309 in the outbound packet. When the remote device 208 responds to the first packet, it transmits a second packet to the first infrastructure station address 219, which is received by the WLC 206. The WLC 206 maintains mapping information that allows the WLC 206 to identify that the second packet is destined for the STA 202. As a result, the WLC 206 replaces the first infrastructure station address 219 (in a destination address field of the second packet), with the first OTA station address 209 of the STA 202. The WLC 206 then forwards the modified second packet to the STA 202. Because the second packet now has a destination address field set to the first OTA station address 209, the STA 202 is able to recognize that the second packet is destined for the STA 202, and thus receives and decodes the second packet accordingly.

FIG. 2 then shows the STA 202 de-associating from the AP 204 via a de-association message exchange including a de-association request 220A and a de-association response 220B. Some wireless standards indicate that the STA 202 should de-associate from the AP 204 before the STA 202 changes its OTA station address. After the de-association message exchange is complete, the STA 202 utilizes a second OTA station address 221 and performs an additional association message exchange including a second association request 222A and a second association response 222B to associate for a second time with the AP 204 using the second OTA station address. An additional 4-way handshake 224 is performed between the STA 202 and the AP 204. The additional 4-way handshake 224 utilizes the new second OTA station address and a new set of keys established during the additional association message exchange 222. The STA 202 then initiates additional IP-based, data communications 226 with the remote device 208. Since the STA 202 utilizes the same IP address for the data communications 226 that it used for the data communications 218, the WLC 206 needs to map the new, second OTA station address of the STA 202 to the first infrastructure address so that the remote device 208 can continue to properly communicate with the STA 202.

Thus, FIG. 2 illustrates an embodiment where a station completely disassociates with an access point, yet maintains use of common IP address for communications with a remote device 208. Not shown in FIG. 2 are message exchanges between the STA 202 and a DHCP service to accomplish an assignment of the common IP address to the STA 202 during both the first association and second association to the AP 204.

Figure 3:
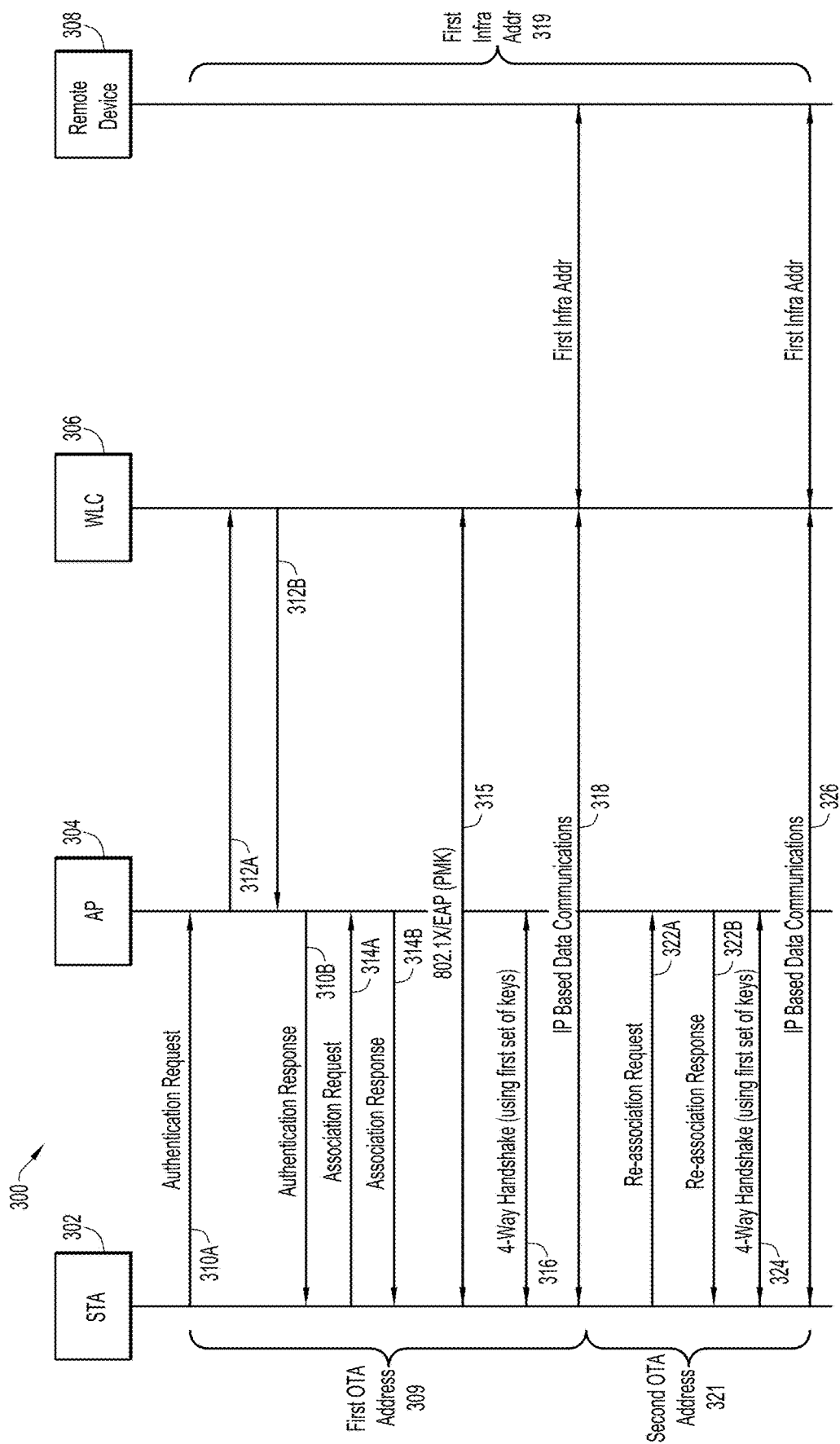
FIG. 3 is a sequence diagram illustrating example message flows between a wireless station and wireless infrastructure components.

FIG. 3 is a sequence diagram 300 illustrating example message flows between a wireless station and wireless infrastructure components. FIG. 3 shows a STA 302, AP 304, WLC 306, and a remote device 308. Similar to the authentication and association process described above with respect to FIG. 2, the STA 302 sends an authentication request message 310A to the access point 304. To accomplish the authentication, the AP 304 performs an authentication exchange with the WLC 306 that includes a request message 312A and response message 312B. In some cases, the WLC 306 interacts with an authentication and authorization service to accomplish the authentication on behalf of the AP 304. Depending on the results of the authentication, the AP 304 sends an authentication response message 310B to the STA 302. The STA 302 then performs an association message exchange including an association request message 314A and receives an association response message 314B from the AP 304. As part of the association message exchange, the AP 304 assigns an association identifier to the STA 302 for use during communications between the STA 302 and the AP 304. The association message exchange also provides the STA 302 with a PMK for communication on the wireless network (e.g., via the association response message 314B).

Based on the PMK obtained during association (e.g. via the 802.1X/EAP authentication exchange 315, the STA 302 performs a 4-way handshake 316 with the AP 304 to successfully establish communications with the AP 304. After successful completion of the 4-way handshake 316, the STA 302 performs communications with the remote device 308 obtained by the STA 302 from a DHCP service (not shown). These IP address-based communications are shown as data communications 318 in FIG. 3.

In a similar manner as that described above with respect to FIG. 2, the WLC 306 performs a mapping between a first OTA station addresses 309 and a first infrastructure station address 319. However, in contrast to the sequence diagram 200 discussed above with respect to FIG. 2, FIG. 3 shows the STA 302 utilizes a second OTA station address 321 without completely de-associating from the AP 304. Instead, the STA 302 performs a re-association message exchange including a re-association request message 322A and a re-association response message 322B. The re-association message exchange re-associates the STA with the AP 204 using the second OTA station address 321. An additional 4-way handshake 324 is performed between the STA 302 and the AP 304. The additional 4-way handshake 324 utilizes the new second OTA station address and the same key(s) established during the association message exchange 314. The STA 302 then initiates additional, IP based, data communications 326 with the remote device 308. Since the STA 302 utilizes the same IP address for the data communications 326 that it used for the data communications 318, the WLC 306 needs to map the new, second OTA station address 321 of the STA 302 to the first infrastructure station address 319 so that the remote device 308 can continue to properly communicate with the STA 302, even though the STA 302 is using the second OTA station address 321 instead of the first OTA station address 309.

Thus, FIG. 3 illustrates an embodiment of a STA performing a re-association message exchange with the AP 304 and reusing one or more authentication keys (e.g. a PMK) with a new, second OTA station address 321. The STA 302 also continues to use a common IP address during both the data communications 318 and data communications 326. As was the case in FIG. 2, FIG. 3 also does not show message exchanges that occur between the STA 302 and a DHCP service. Such message exchanges accomplish an assignment of the common IP address to the STA 302 for use with both the first OTA station address 309 and the second OTA station address 321.

Figure 4:
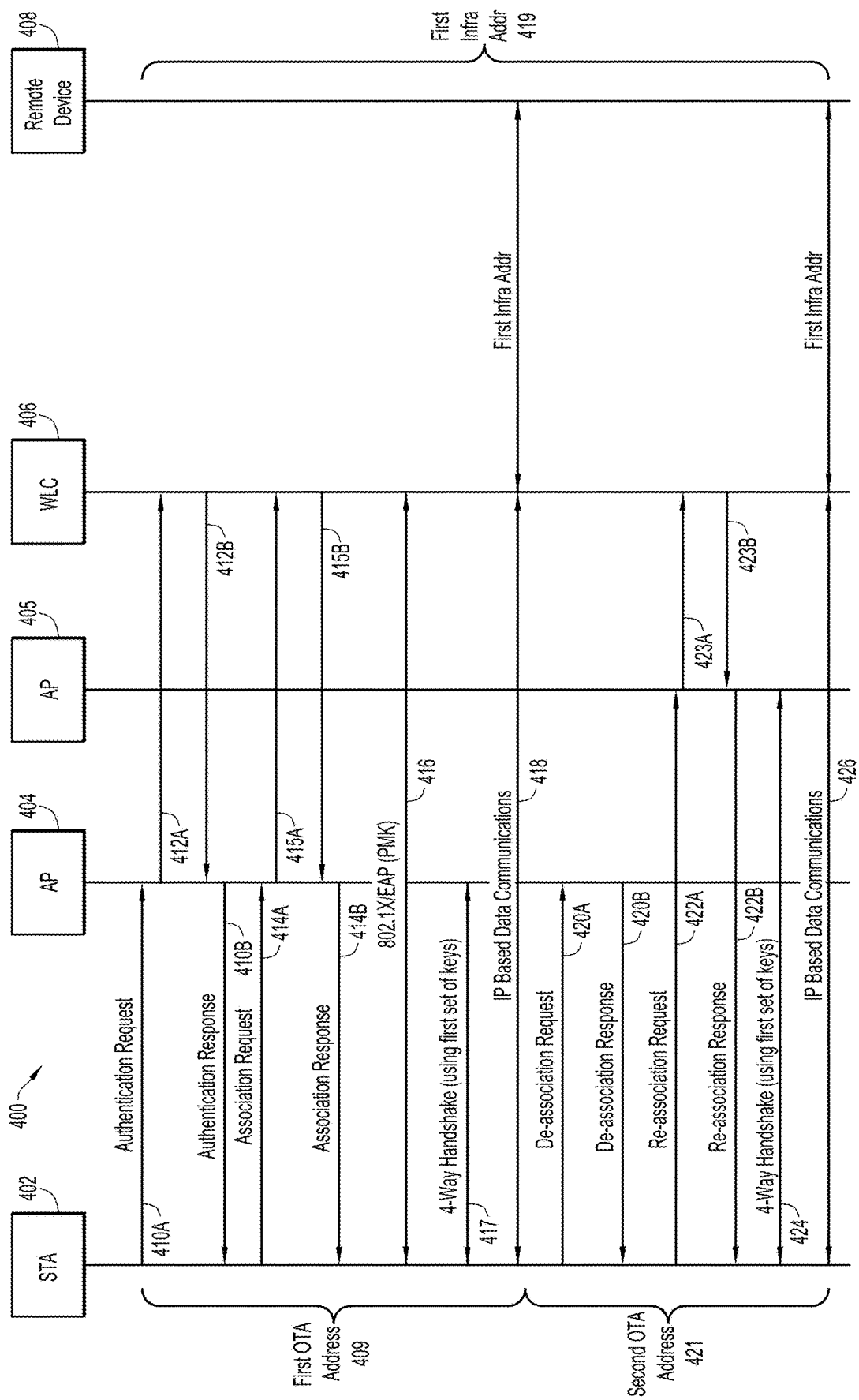
FIG. 4 is a sequence diagram illustrating example message flows between a wireless station and wireless infrastructure components.

FIG. 4 is a sequence diagram 400 illustrating example message flows between a wireless station and wireless infrastructure components. FIG. 4 is similar to the previous two sequence diagrams of FIG. 2 and FIG. 3, in that FIG. 4 shows a STA 402. Using a first OTA station address 409, associating with an AP 404, via an authentication message exchange, including an authentication request message 410A and an authentication response message 410B. The AP 404 then communicates with the WLC 406 via message 412A and response message 412B to authentication the STA 402, FIG. 4 also shows an association message exchange including an association request message 414A and an association response message 414B. As part of the association message exchange, the AP 404 exchanges a message 415A and response 415B with the WLC 406. In some embodiments, the STA 402 derives a PMK via an 802.1X/EAP authentication message exchange through the WLC 406. To accomplish the 802.1X/EAP authentication, the WLC 406 interacts, in some embodiments, with an authentication server, but this interaction is not shown in FIG. 4 to preserve figure clarity. The STA 402 then performs a first 4-way handshake 417 using the PMK derived from the 802.1X/EAP authentication exchange 416. FIG. 4 illustrates that the authentication message exchange 410 between the STA 402 and the AP 404 causes the AP 404 to communicate with the WLC 406 via an association message exchange 412. Similarly, the association message exchange 414 between the STA 402 and the AP 404 causes the AP 404 and the WLC 406 to exchange association messages 415. After the 4-way handshake 417 completes successfully, the STA 402 is able to exchange IP based communications 418 with the remote device 408 via a first infrastructure station address 419.

FIG. 4 also shows that the STA 402 then de-associates with the AP 404 via a de-association message exchange including a de-association request message 420A and a de-association response message 420B.

FIG. 4 then illustrates the STA 402 modifying its OTA station address from the first OTA station address 409 to a second OTA address 421, and performing a re-association message exchange with an AP 405 including a re-association request message 422A and a re-association response message 422B. The re-association exchange utilizes the second OTA address 421 to identify the STA 402. The re-association by the STA 402 with the AP 405 causes the AP 405 to perform an association message exchange with the WLC 406 that includes message 423A and response 423B.

The STA 402 then performs a second 4-way handshake 424 with the AP 405 using the same set of keys used in the first 4-way handshake 417 that the STA 402 performed with the AP 404. Once communication is established between the STA 402 and the AP 405 via the first set of keys, FIG. 4 shows IP based communications 426 occurring between the STA 402 and the remote device 408. Note that the STA 402 uses the second OTA address 421 for these communications, but the STA's identity is expressed by the WLC 406 to the remote device 408 using the first infrastructure station address 419, which is the same address that was used to express the STA's identity when it used the first OTA station address 409. In some embodiments, the first 4-way handshake 417 and the second 4-way handshake 424 utilize a common PMK (e.g. reference a common PMK identifier). Thus, some embodiments recognize that traffic referencing the first OTA station address 409 and the second OTA address 421 relate to a common station, and configure network parameters of the common station or wireless terminal based on this recognition. For example, as discussed above, some embodiments, by recognizing use of a common PMK by both OTA station addresses, map both OTA station addresses to a single infrastructure station address, such as the first infrastructure station address 419 discussed above.

Figure 5:
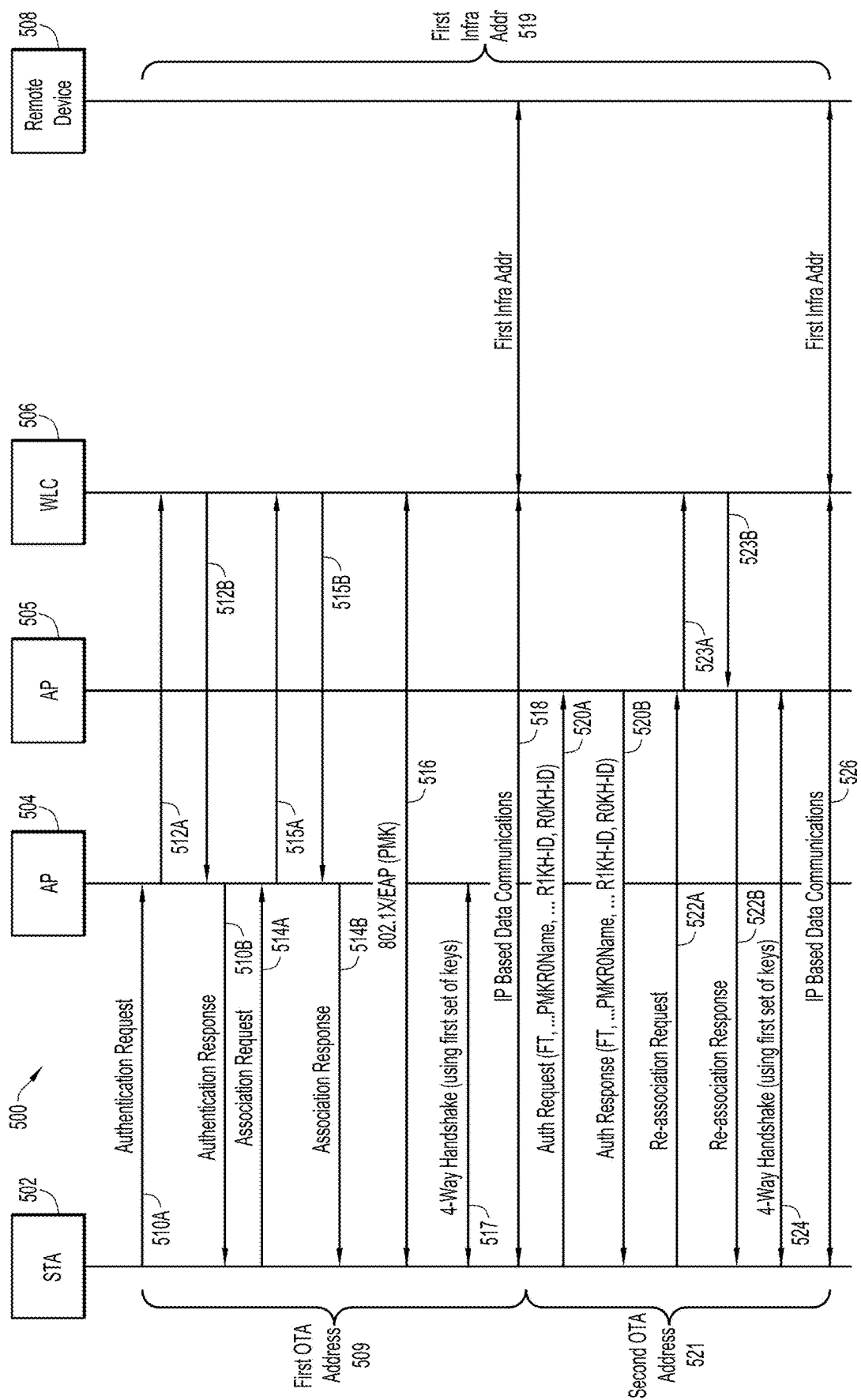
FIG. 5 illustrates a message exchange depicting address rotation of an STA according to an example embodiment.

FIG. 5 illustrates an example message exchange 500 implemented in one or more of the disclosed embodiments. Similar to some of the figures discussed above, FIG. 5 illustrates a STA 502 authenticating and associating with an AP 504 using a first OTA address 509. The authentication is accomplished with authentication message exchange including an exchange of an authentication request message 510A and an authentication response message 510B between the STA 502 and the AP 504. The authentication message exchange also includes an authentication message exchange including the message 512A and response 512B between the AP 504 and the WLC 506. FIG. 5 also illustrates the STA 502 and AP 504 exchanging association request message 514A and association response message 514B to associate the STA 502 with the AP 504. To accomplish the association, the AP 504 communications with the WLC 506 via message 515A and response 515B. FIG. 5 further illustrates an EAP authentication 516 that occurs between the STA 502 and the WLC 506. The EAP authentication 516 provides the STA 502 with a PMK. A 4-way handshake 517 then occurs between the STA 502 and AP 504 using the PMK received by the STA 502. IP based communications 518 then occur between the STA 502 and the remote device 508 using the first OTA address 509, which the WLC 506 maps to a first infrastructure station address 519.

FIG. 5 then shows the STA 502 modifying its OTA station address to a second OTA address 521, and then performing an 802.11 FT procedure to associate with a second AP 505. (The STA 502 could also re-associate with the AP 504 in some circumstances). The 802.11 FT procedure includes a request message 520A that specifies one or more of a PMKR0Name or PMKR1Name. This information would have also been present during the EAP authentication 516 that occurred earlier between the STA 502 and the AP 504. A response 520B is generated by the second AP 505 and provided to the STA 502. The STA 502 then performs a re-association with the second AP 505 that includes a re-association request message 522A and a re-association response message 522B. To perform the re-association, the second AP 505 corresponds with the WLC 506 via a message exchange that includes a message 523A and a response message 523B. The STA 502 then performs a 4-way handshake 524 with the second AP 505. Once the 4-way handshake 524 is successful, the STA 502 is able to perform IP based communications 526 with the remote device 508. Thus, some embodiments utilize one or more of a PMKR0Name or PMKR1Name specified as part of the 802.11 FT procedure to determine that network traffic referencing the second OTA address 521 is relevant or associated with a common station as traffic referencing the first OTA address 509, based on the fact that both OTA station addresses reference a common set of PMKR0Name or PMKR1Name.

Figure 6:
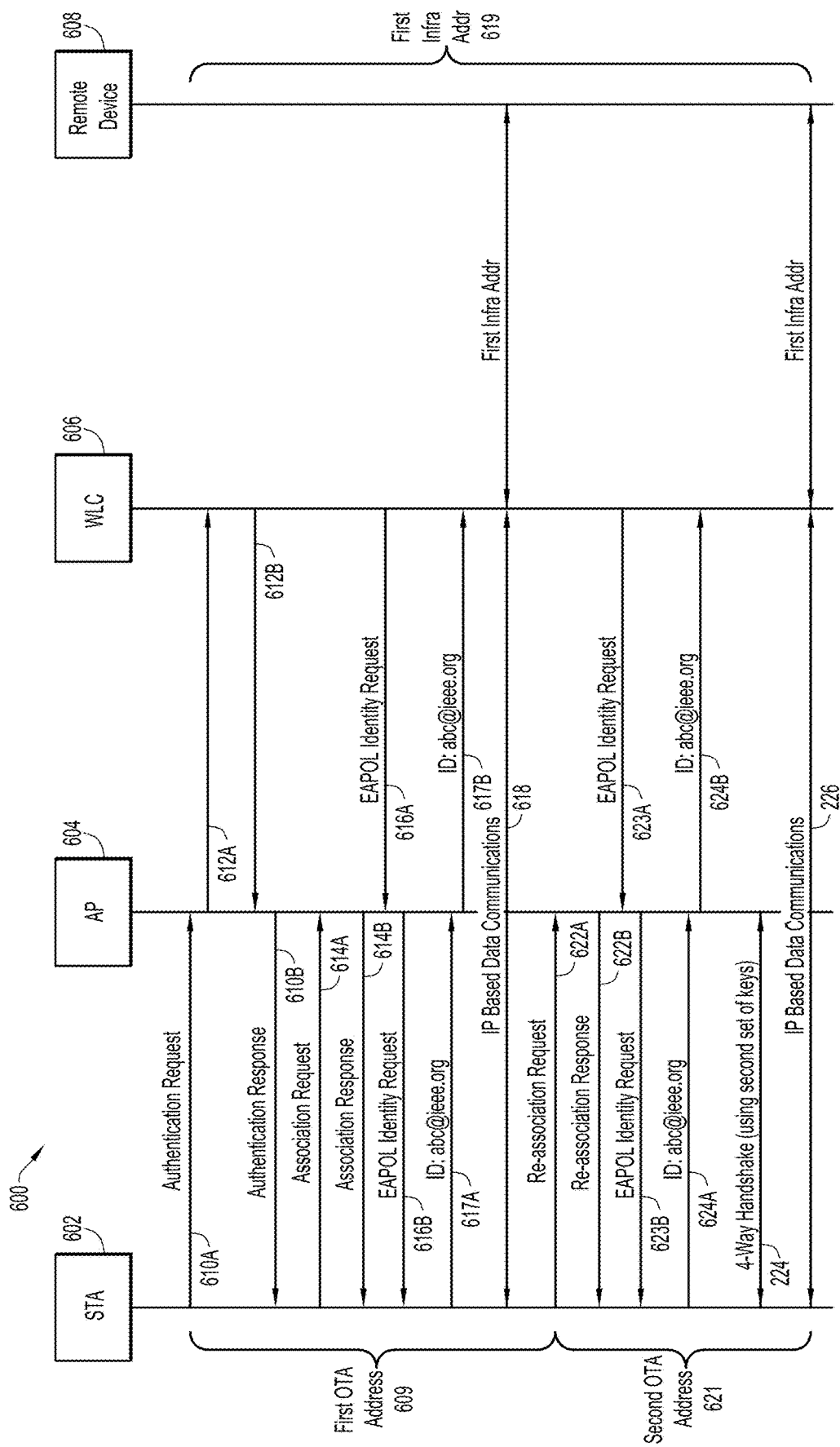
FIG. 6 illustrates a message exchange depicting address rotation of an STA, according to an example embodiment.

FIG. 6 illustrates an example message exchange 600 implemented in one or more of the disclosed embodiments. Similar to some of the figures discussed above, FIG. 6 illustrates a STA 602 authenticating and associating with an AP 604 using a first OTA address 609. The authentication is accomplished with authentication message exchange between the STA 602 and the AP 604. The authentication message exchange includes an authentication request message 610A and an authentication response message 610B. The AP 604 exchanges a message 612A and response message 612B with the WLC 606 as part of the authentication message exchange. FIG. 6 also illustrates the STA 602 and AP 604 exchanging an association request message 614A and association response message 614B to associate the STA 602 with the AP 604. FIG. 6 further illustrates an Extensible Authentication Protocol over LAN (EAPOL) identity request message 616A transmitted from the WLC 606 to the AP 604, which forwards the EAPOL identity request message 616A as 616B to the STA 602. The STA 602 responds to the EAPOL identity request message 616B with an identity message 617A indicating an identity string of the STA 602. This information is forwarded to the WLC 606 by the AP 604 in message 617B. FIG. 6 further illustrates the STA 602 performing IP based data communications 618 with a remote device 608 using an IP address. The first OTA address 609 is mapped, by the WLC 606, to a first infrastructure address 619 to accomplish the IP based data communications 618 between the STA 602 and the remote device 608.

FIG. 6 further illustrates the STA 602 using a second OTA address 621 to perform a re-association request message exchange with the AP 604 including a re-association request message 622A and re-association response message 622B. Once associated with the AP 604, the WLC 606 sends an additional EAPOL identity request message 623A to the AP 604, which is forwarded as message 623B to the STA 602. The STA 602 again responds with the response message 624B indicating an identity equivalent to the identity expressed in the identity message 617A. Upon receiving the message 624A, the AP 604 forwards the response message 624B as response message 624B to the WLC. Once the STA is successfully identified, additional IP based communications 626 occur.

Thus, in the example of FIG. 6, the WLC 606 is able to identify the common EAPOL identity expressed by the STA 602 when using both the first OTA address 609 and second OTA address 621. In some other circumstances (not shown), the STA 602 expresses a different EAPOL identity when utilizing the first OTA address 609 and the second OTA address 621. In this case, the EAPOL identity will not provide an indication that the STA 602 is using both of these addresses. However, other indicators, discussed throughout this disclosure, may provide sufficient cause for a determination that traffic referencing either of the first OTA address 609 or the second OTA address 621 are relevant to the STA 602.

Figure 7A:
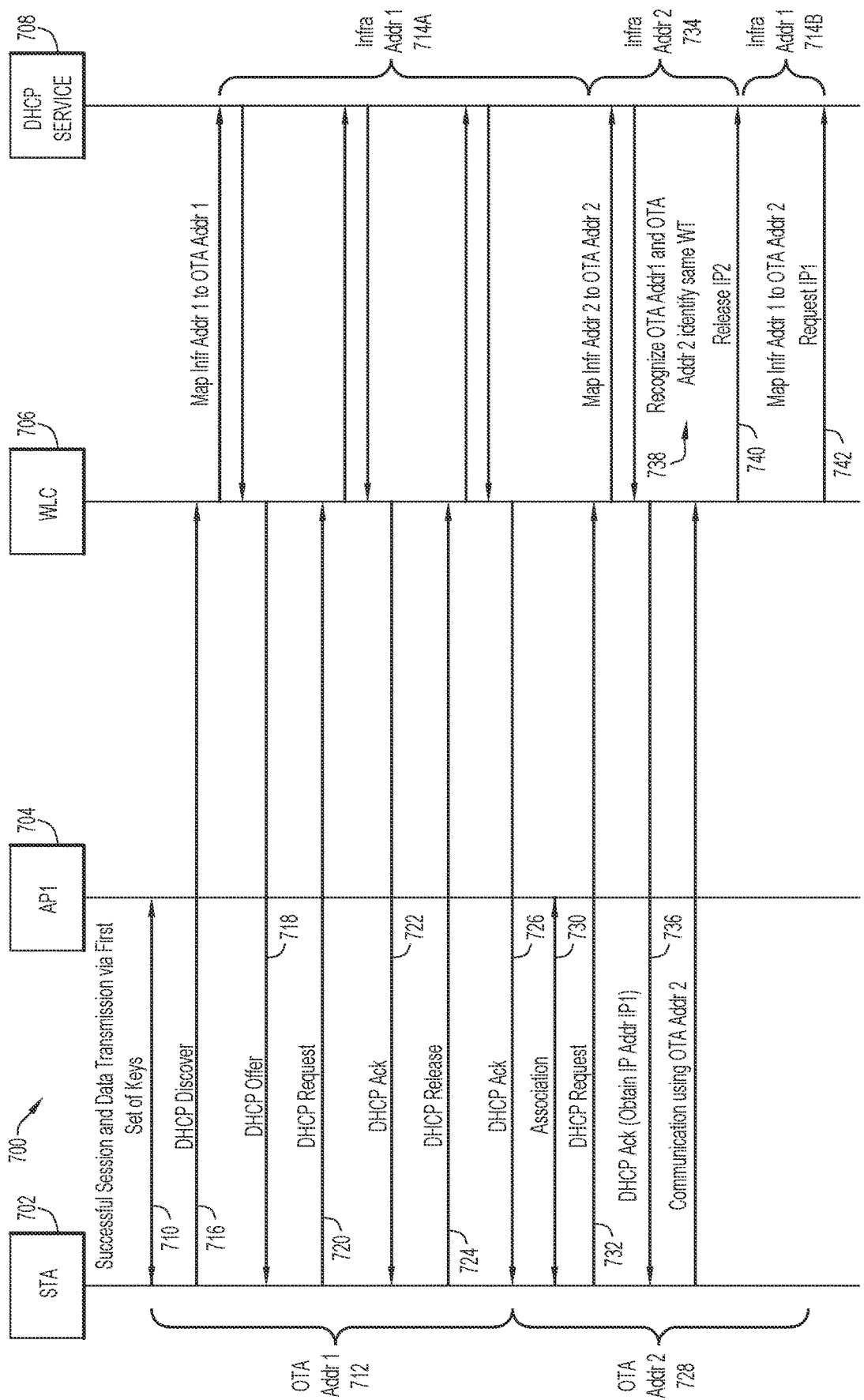
FIG. 7A illustrates a message sequence depicting address rotation of an STA according to an example embodiment.

FIG. 7A illustrates an example message sequence 700 implemented in one or more of the disclosed embodiments. FIG. 7A shows a STA 702, AP 704, WLC 706, and a DHCP service 708. FIG. 7A shows that the STA 702 and AP 704 successfully authenticate and associate via message exchange 710. FIG. 7A also illustrates that the WLC 706 maps a first OTA station address 712 used by the STA 702 to a first infrastructure station address 714A. For example, the mapping can occur, as illustrated when the STA 702 sends a DHCP discover message 716 to the DHCP service 708. Additional DHCP messages, including a DHCP offer message 718, DHCP request message 720, and DHCP acknowledge message 722 are passed between the STA 702 and the DHCP service 708 to allocate an IP address to the STA 702. FIG. 7A illustrates that the STA 702 then releases its IP address back to the DHCP service 708 via DHCP release message 724 and DHCP acknowledge message 726.

FIG. 7A then illustrates that the STA 702 successfully associates or re-associates 730 with the AP 704 using the second OTA station address 728. The STA 702 issues a DHCP request 732 and obtains the same IP address it used previously when the first OTA station address 712 was being used. In order to transmit the DHCP request 732 to the DHCP service 708, the WLC maps the second OTA station address 728 to a second infrastructure station address 734. At the time of this mapping, the WLC 706 does not recognize that communications indicating the second OTA station address 728 are coming from the same device as previous communications indicating the first OTA station address 712. Thus, when the DHCP service 708 processes the DHCP request 732, it assigns an IP address to a device based on the second infrastructure station address 734. This assignment is communicated back to the STA 702 via the DHCP acknowledge message 736. Later, at a time 738, the WLC determines that messages indicating the first OTA station address 712 and second OTA station address 728 are from the same physical device. The WLC 706 also recognizes that the two addresses have been incorrectly mapped to two different infrastructure station addresses (e.g., the first infrastructure station address 714A-714B and the second infrastructure station address 734).

Thus, in response to this recognition, the WLC 706 proactively releases the allocation of the IP address from the second infrastructure station address 734 via DHCP release message 740 and allocates the IP address back to the first infrastructure station address 714B.

Figure 7B:
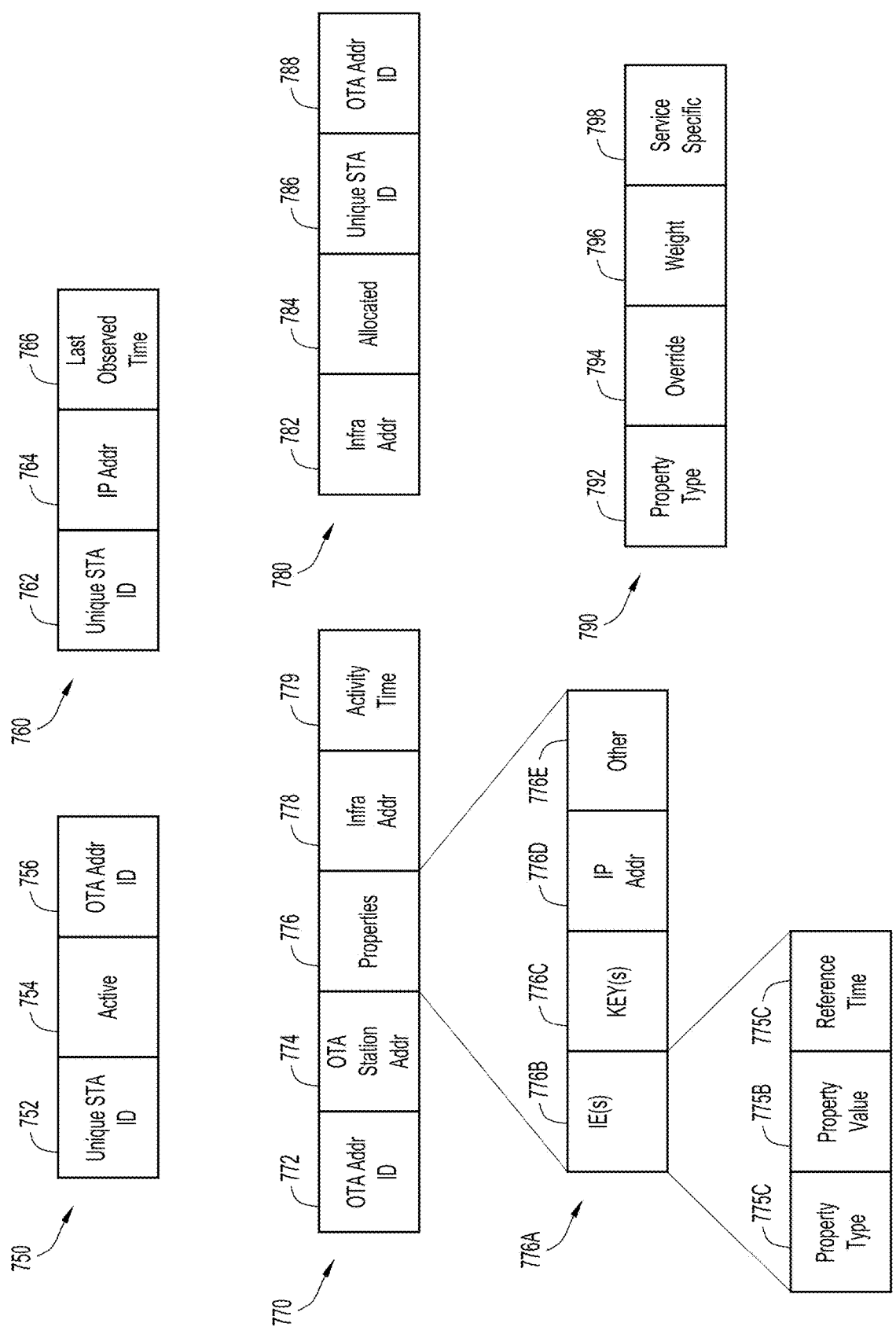
FIG. 7B illustrates data structures implemented in one or more of the disclosed embodiments.

FIG. 7B illustrates example data structures implemented in one or more of the disclosed embodiments. While the example data structures of FIG. 7B are discussed below as relational database tables, in various embodiments, a variety of different data architectures are used. For example, some embodiments utilize one or more of unstructured data stores, arrays, linked lists, hierarchical data stores, or other data organizations. Thus, the disclosed embodiments are not limited to the example data structures of FIG. 7B.

FIG. 7B shows a STA table 750, an IP table 760, an OTA address table 770, an infrastructure address table 780, and a property table 790. The STA table 750 tracks information relating to a particular STA. The STA table 750 includes a STA identifier field 752, a STA state field 754, and an OTA station address identifier field 756. The STA identifier field 752 uniquely identifies a physical STA or device. The STA state field 754 indicates whether the STA identified by the STA identifier field 752 is considered to be active or otherwise participating in the network. The STA state field 754 indicates, in some embodiments, whether the STA identified by the STA identifier field 752 has existing network or computing resources allocated for its use. The STA state field 754 also indicates, in some embodiments, whether the identified STA is in the process of rotating or otherwise modifying its OTA address. The OTA station address identifier field 756 indicates an identifier of an OTA address in use by the STA.

The IP table 760 stores state information indicating which IP addresses are in use by particular STAs. The IP table 760 includes a STA identifier field 762, an IP address field 764, and a last observed time field 766. The STA identifier field 762 uniquely identifies a particular device, and can be cross referenced with other STA identifier fields discussed with respect to FIG. 7B. The IP address field 764 stores an IP address allocated to the STA identified by the STA identifier field 762. The last observed time field 766 indicates a most recent time when use of the indicated IP address was observed.

The OTA address table 770 tracks information related to OTA addressed used by STA's managed by the disclosed embodiments. The OTA address table 770 includes an OTA address identifier field 772, OTA station address field 774, a properties field 776, and an infrastructure address field 778. The OTA address identifier field 772 uniquely identifies an OTA address, and can be cross referenced with other OTA address identifier fields discussed with respect to FIG. 7B. The OTA station address field 774 stores an OTA address used by a STA managed by the disclosed embodiments. The properties field 776 indicates network elements, network resources, or properties of a device that referenced that OTA station address indicated by the OTA station address field 774. For example, the properties field 776 can indicate one or more of Information Elements (IEs) such as the Capability Information Element (e.g., any one or more of the extended service set (ESS) capability bit, a scrambler seed property value, a capability value, a value of a privacy/wired equivalent privacy (WEP) bit, the short preamble bit, the packet binary convolution coding (PBCC) bit, the channel agility bit, the spectrum management bit, the short slot time bit, the automatic unscheduled power save delivery (uA-PSD) bit, the radio measurement support bit, and the delayed and immediate block acknowledgement (ACK) policy bits), supported rates element, the power capability element (e.g., the STA min/max power range), the supported channels list, the rate matching (RM) extended capability elements (in particular support information for link measurement, neighbor report, parallel measurement, repeated measurement, beacon passive measurement, beacon active measurement, beacon table measurement, beacon measurement reporting condition, frame measurement, channel load measurement, noise histogram measurement, statistics measurement, a low cost infrastructure (LCI) measurement, LCI azimuth capability, transmit stream/category measurement, triggered transmit stream/category measurement, AP channel report capability, RM management information block (MIB) capability, operating channel max measurement duration value, non-operating channel max measurement duration value, measurement pilot capability, measurement pilot transmission information, neighbor report time synchronization function (TSF) offset, received channel power indication (RCPI) measurement capability, received signal to noise indicator (RSNI) measurement capability, basic service set (BSS) average delay capability, BSS available capacity capability, antenna capability), the high throughput (HT) capability declarations (14 different parameters, including support for channel width, number of streams, and transmissions modes like delayed ACK, Tx space time block code (STBC) or RX STBC, data security standard (DSS)/complementary code keying (CCK) mode in 40 Megahertz (MHz), HT long signal field (L-SIG) protection support, or power save multi-poll (PSMP) support), the aggregated message protocol data unit (A-MPDU) parameters (max A-MPDU length and density), the Rx supported modulation and coding scheme (MCS) (12 different values), the HT extended capabilities (PC0 support, transition mode, MCS feedback capability, reverse direction transponder support), transmit beam forming (TxBF) capabilities (20 different bits/functions), antenna selection (ASEL) capabilities (8 different functions/bits), the Extended capabilities element (up to 10 different octets, thus up to 80 parameters), the very high throughput (VHT) capability element (18 different elements, including single user (SU) beam forming support, multi-user (MU) beam forming support, transmission opportunity (TXOP) power save (PS) support, VHT link adaptation supports, etc.), pairwise master key, pairwise master key identifier, pairwise master key name (e.g., R0 and/or R1), pairwise master key, pairwise master key identifier, pairwise master key name (e.g., R0 and/or R1), and/or the VHT supported Rx and Tx MCS (up to 31 values each).

In some embodiments, one or more of the properties above are assigned a unique identifier, and the property is identified by the predefined unique identifier in the properties field 776. For example, FIG. 7B shows example properties stored in the properties field 776 can be comprise of a property type field 775A and/or a property value field 775B. Some embodiments also track a reference time of each property (e.g. via reference time field 775C). Example properties illustrated in FIG. 7B include one or more information element values 776B, key values 776C, IP addresses 776D, or other properties 776E, such as any one or more of the example properties discussed above.

The infrastructure address table 780 includes an infrastructure address field 782, an allocated field 784, a unique STA identifier field 786, and an OTA address identifier field 788. The infrastructure address field 782 stores an infrastructure address that is mapped, in at least some embodiments, to an OTA address of a STA. The allocated field 784 indicates whether the infrastructure station address stored in the infrastructure address field 782 is currently allocated to a STA or not. The unique STA identifier field 786 indicates a STA to which the infrastructure address is allocated. The OTA address identifier field 788 indicates to which OTA address the infrastructure address is allocated.

The property table 790 includes a property type field 792, an override field 794, a property weight field 796, and a service specific indicator field 798. The property type field 792 uniquely identifies a particular property type exhibited by traffic referencing an OTA station address. For example, the property type field 792 identifies, in some embodiments, any of the example properties discussed above with respect to the properties field 776. The override field 794 indicates whether the identified property is an override property. An override property is one that, if common between two sets of traffic referencing two different OTA station addresses, indicates that both sets of traffic are associated with a common physical device (e.g. a common wireless station or wireless terminal). The property weight field 796 indicates a weight associated with the identified property. Some embodiments compute a similarity score between two OTA station addresses based on a set of common properties exhibited by traffic references the two different OTA station addresses. For example, some properties indicate a higher likelihood of two sets of traffic being associated with a single device than other properties that may be common. Use of the weight adjusts for these considerations. For example, in some embodiments, a weighted sum of common properties is calculated to determine the similarity score. The service specific indicator field 798 indicates whether a property is service specific. In other words, some properties relate to a single service. Examples of service specific properties include, for example, a key for communication with a particular service.

Figure 8:
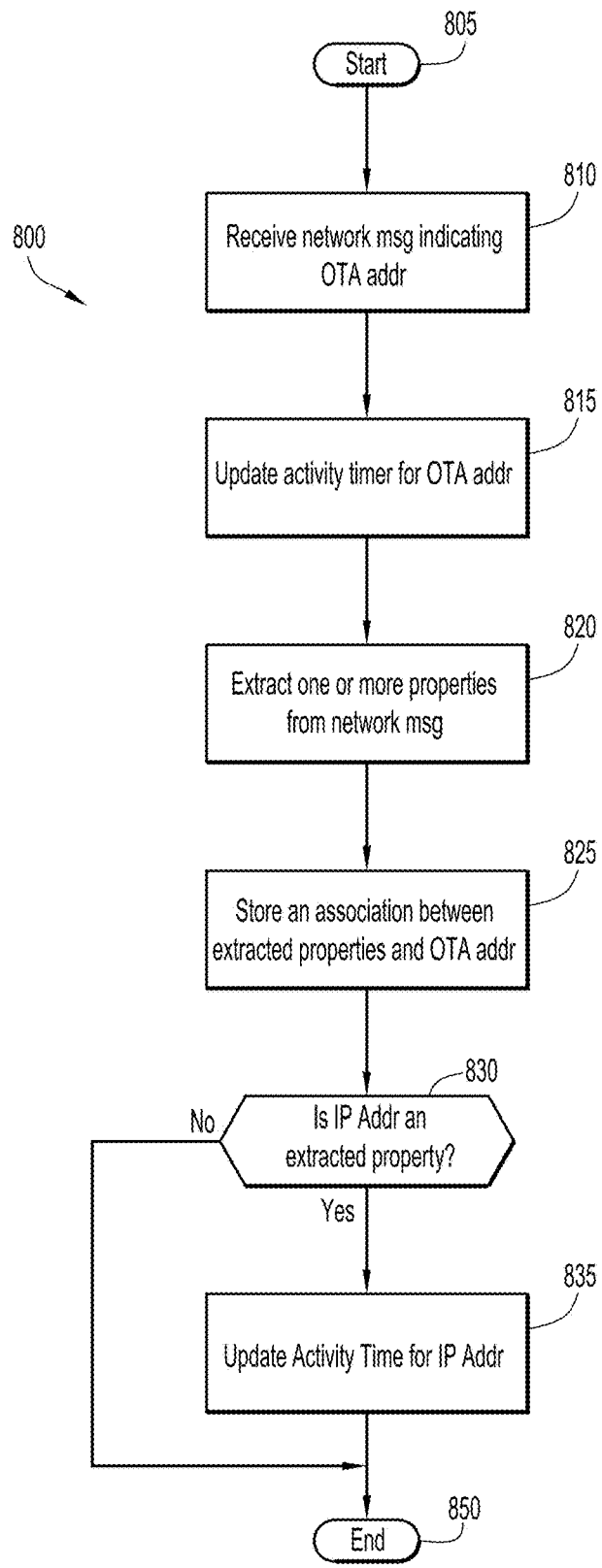
FIG. 8 is a flowchart of a method of collecting properties of an OTA station address based on traffic referencing the OTA station address, according to an example embodiment.

FIG. 8 is a flowchart of an example method 800 of collecting properties of an OTA station address based on traffic referencing the OTA station address. In some embodiments, one or more of the functions discussed below with respect to FIG. 8 and method 800 are performed by hardware processing circuitry. For example, in some embodiments, instructions stored in a memory (e.g. memory element(s) 1904) configure hardware processing circuitry (e.g., processor(s) 1902) to perform one or more of the functions discussed below with respect to FIG. 8 and method 800.

After start operation 805, method 800 moves to operation 810. In operation 810, a network message is received indicating an OTA station address. In some embodiments, the network message indicates the OTA station address in a destination address field of the network message. In other embodiments, the network message indicates the OTA station address in a source address field of the network message.

In operation 815, an activity time for the OTA address (addr) is updated. For example, in some embodiments, operation 815 updates the activity time field 779 to indicate a current time, indicating use of the OTA address.

In operation 820, one or more properties are extracted from the network message. For example, in some embodiments, operation 820 parses or otherwise decodes information from the network message to identify one or more properties. The properties can include, for example, information element values, IP address values, key values (e.g., PMKID value), or any of the example property values discussed above with respect to FIG. 7B and the properties field 776.

In operation 825, an association between the extracted properties and the OTA address is stored in a data store. For example, as discussed above with respect to FIG. 7B, some embodiments store the extracted properties in the properties field 776, which associates the stored properties with the OTA address (via the OTA station address field 774).

Decision operation 830 determines whether one of the extracted properties is an IP address. If one of the properties is an IP address, method 800 moves to operation 835 which updates an activity timer for the IP address. For example, as discussed above with respect to FIG. 7B, some embodiments update a field analogous to the last observed time field 766 in the IP table 760.

After operation 835 completes, or decision operation 830 determines no IP address was extracted from the network message received in operation 810, method 800 moves to end operation 850.

Figure 9:
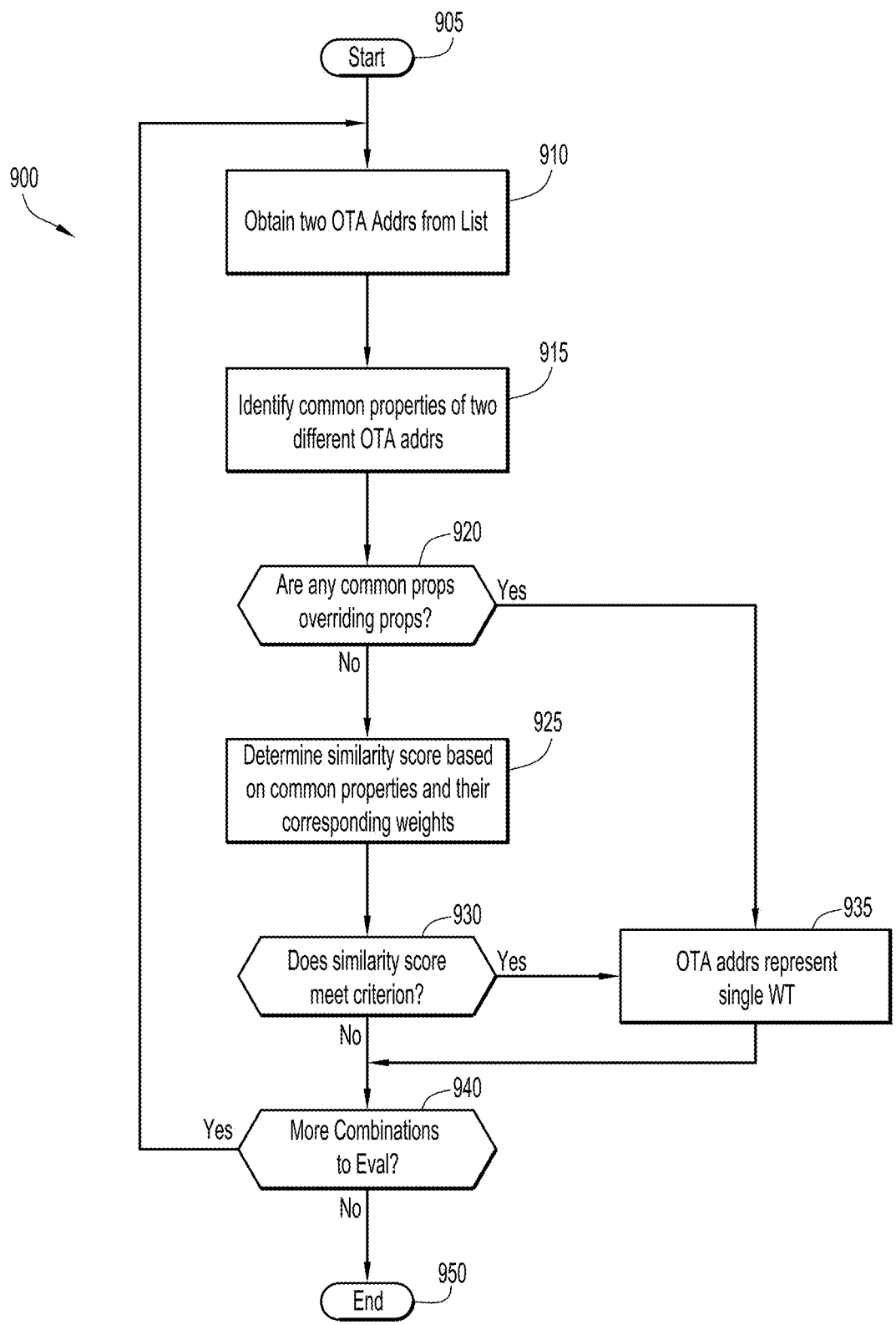
FIG. 9 is a flowchart of a method of determining whether properties exhibited by two different OTA addresses are associated with a common device, according to an example embodiment.

FIG. 9 is a flowchart of an example method 900 of determining whether properties exhibited by two different OTA addresses are associated with a common device. In some embodiments, one or more of the functions discussed below with respect to FIG. 9 and method 900 are performed by hardware processing circuitry. For example, in some embodiments, instructions stored in a memory (e.g., memory element(s) 1904 discussed below) configure hardware processing circuitry (e.g., processor(s) 1902 discussed below) to perform one or more of the functions discussed below with respect to FIG. 9 and method 900. In some embodiments, method 900 is performed iteratively or periodically. In some embodiments, method 900 is performed at least after a station or STA associates with an AP. In some embodiments, method 900 is performed after each authentication of a station. For example, the method 900 is iteratively performed, in at least some embodiments, after an 802.1X/EAP authentication, after completion of a four-way authentication handshake, after session establishment, after a station interacts with a DHCP service. In some embodiments, an order in which servers are contacted is examined by method 900. In some embodiments, time intervals between association and/or authentication exchanges are also examined by method 900.

After start operation 905, method 900 moves to operation 910. In operation 910, two OTA addresses are obtained from a list. For example, in some embodiments, the list of OTA addresses is analogous to the OTA address table 770, discussed above with respect to FIG. 7B. In some embodiments, an OTA address marked active (e.g. via the STA state field 754 and OTA station address identifier field 756) is one of the OTA addresses obtained in operation 910, and the other OTA address obtained in operation 910 is marked inactive (e.g. via the STA state field 754).

Operation 915 determines common properties between the two OTA addresses. For example, in some embodiments, operation 915 compares data analogous to the properties field 776 of the OTA address table 770 for two different OTA addresses. Properties having common property identifies and equivalent property values are identified as common properties, at least in some embodiments. Decision operation 920 determines whether any of the common properties are classified as overriding properties. For example, as discussed above with respect to FIG. 7B and the property table 790, some embodiments classify one or more properties as overriding properties, indicating that if the properties are common between two sets of network traffic referencing two different station addresses then the two station addresses are to be considered as referencing a common device or common station. If at least one of the common properties are designated as overriding properties, method 900 moves from decision operation 920 to operation 935, where method 900 concludes that the two OTA address represent a single STA. Otherwise, method 900 moves from decision operation 920 to operation 925, which determines a similarity score between the two OTA addresses based on their common properties and the respective weights of the common properties. As discussed above, some embodiments determine a similarity score between two OTA addresses by computing a weighted sum of their common properties. Method 900 then moves to decision operation 930, which determines if the computed similarity score meets a criterion (e.g., is above a predefined threshold or otherwise indicates sufficient similarity).

If the similarity score indicates the two OTA addresses exhibit sufficiently similar properties, method 900 moves from decision operation 930 to operation 935, which determines the two OTA addresses identify a common device. Embodiments perform a variety of actions based on the determination of operation 935. For example, some embodiments map an infrastructure address previously mapped to one of the OTA addresses to the other of the two OTA addresses based on the determination of operation 935. Some embodiments, as discussed above, remap IP addresses, via message exchanges with a DHCP service or other IP address allocation service, such that an IP address associated with the second of the OTA addresses is also now associated with the first infrastructure address.

After completion of operation 935, or when decision operation 930 concludes the similarity score between the two addresses do not exhibit sufficient similarity, method 900 moves to decision operation 940. Decision operation 940 evaluates whether other combinations of two OTA addresses should be evaluated by method 900. For example, in some embodiments, combinations of OTA addresses with activity times within a threshold period of time are generated by method 900 and method 900 then iterates through the combinations to evaluate whether any two of the OTA addresses indicate a common device. If decision operation 940 determines additional combinations are to be evaluated, processing returns to operation 910. Otherwise, method 900 moves to end operation 950.

Figure 10:
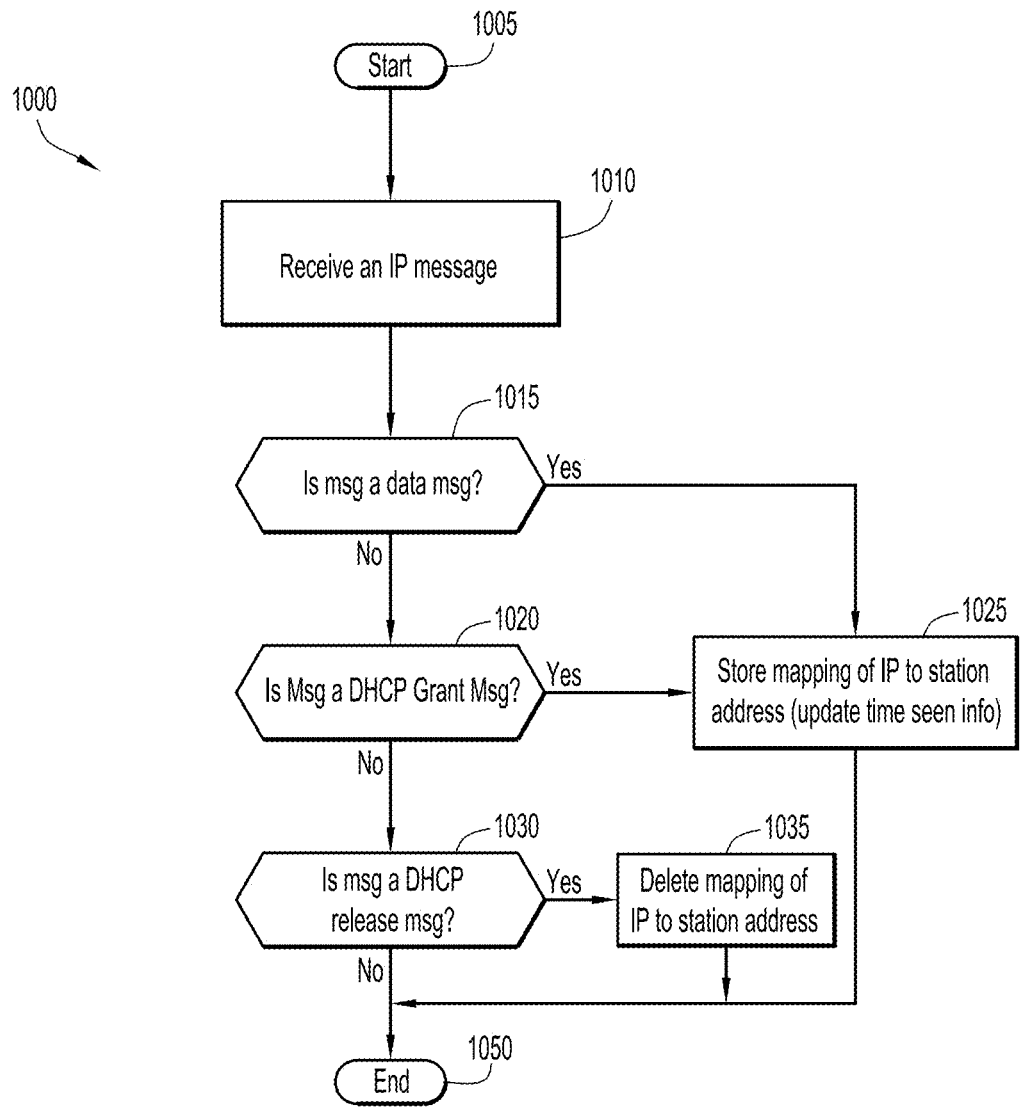
FIG. 10 is a flowchart of a method of maintaining a mapping of OTA station addresses to Internet Protocol (IP) addresses by observing traffic referencing one or more of the OTA station address and/or IP address, according to an example embodiment.

FIG. 10 is a flowchart of an example method 1000 of maintaining a mapping of OTA station addresses to IP addresses by observing traffic referencing one or more of the OTA station address and/or IP address. For example, in some embodiments, the method 1000 discussed below with respect to FIG. 10 maintains a data structure analogous to the IP table 760, discussed above with respect to FIG. 7B. In some embodiments, one or more of the functions discussed below with respect to FIG. 10 and method 1000 are performed by hardware processing circuitry. For example, in some embodiments, instructions stored in a memory (e.g. memory element(s) 1904) configure hardware processing circuitry (e.g., processor(s) 1902) to perform one or more of the functions discussed below with respect to FIG. 10 and method 1000.

After start operation 1005, method 1000 moves to operation 910. In operation 1010, an IP message (msg) is received. An IP message in operation 1010 is a message referencing an IP address. The IP address is referenced, in some embodiments, in a source IP address field or a destination IP address field of a network message. In other embodiments, the IP message is a message exchanged between a STA and a DHCP service.

Decision operation 1015 determines whether the received message is an IP data message. In other words, decision operation 1015 determines whether the received message includes an IP header specifying source and destination IP addresses. If the message is a data message, method 1000 moves from decision operation 1015 to operation 1025, which stores a mapping of IP address to OTA station address. For example, in some embodiments, operation 1025 updates a data structure analogous to the IP table 760, discussed above with respect to FIG. 7B. If the message is not an IP data message, method 1000 moves from decision operation 1015 to decision operation 1020, which determines whether the message is a DHCP grant message (e.g. a DHCP Offer message or a DHCP request message). For example, in some embodiments, decision operation 1020 parses or otherwise decodes the received message to identify a DHCP header, and then decodes or otherwise parses the DHCP header to determine a type of DHCP message. If the message is a DHCP grant message, the message indicates an allocation of a particular IP address to a device, with the device being identified via a station address. As method 1000 is performed, in at least some embodiments, by a WLC, the WLC is able to map from an infrastructure station address used to communicate with the DHCP service, to an OTA address that is mapped to the infrastructure station address (e.g., via a data structure analogous to the infrastructure address table 780).

If the received message is not a DHCP grant message, method 1000 moves from decision operation 1020 to decision operation 1030, which evaluates whether the received message is a DHCP release message. For example, in some embodiments, decision operation 1030 decodes or otherwise parses the received message to detect whether the message includes a DHCP header, and if so, a type of the DHCP message. If the message is a DHCP release message, the message indicates a deallocation of a specified IP address to a device, with the device being identified by an infrastructure station address included in the received message. If the message is a DHCP message, method 1000 moves from decision operation 1030 to operation 1035, which deletes a mapping of the IP address indicated in the message to a station address. The station address is an OTA station address that maps to the infrastructure station address indicated in the received message. In some embodiments, operation 1035 operates on a data structure analogous to the IP table 760, discussed above with respect to FIG. 7B. If decision operation 1030 determines the message is not a DHCP release message, method 1000 moves from decision operation 1030 to end operation 1050. Similarly, after operation 1035 completes, method 1000 moves from operation 1035 to end operation 1050.

Figure 11:
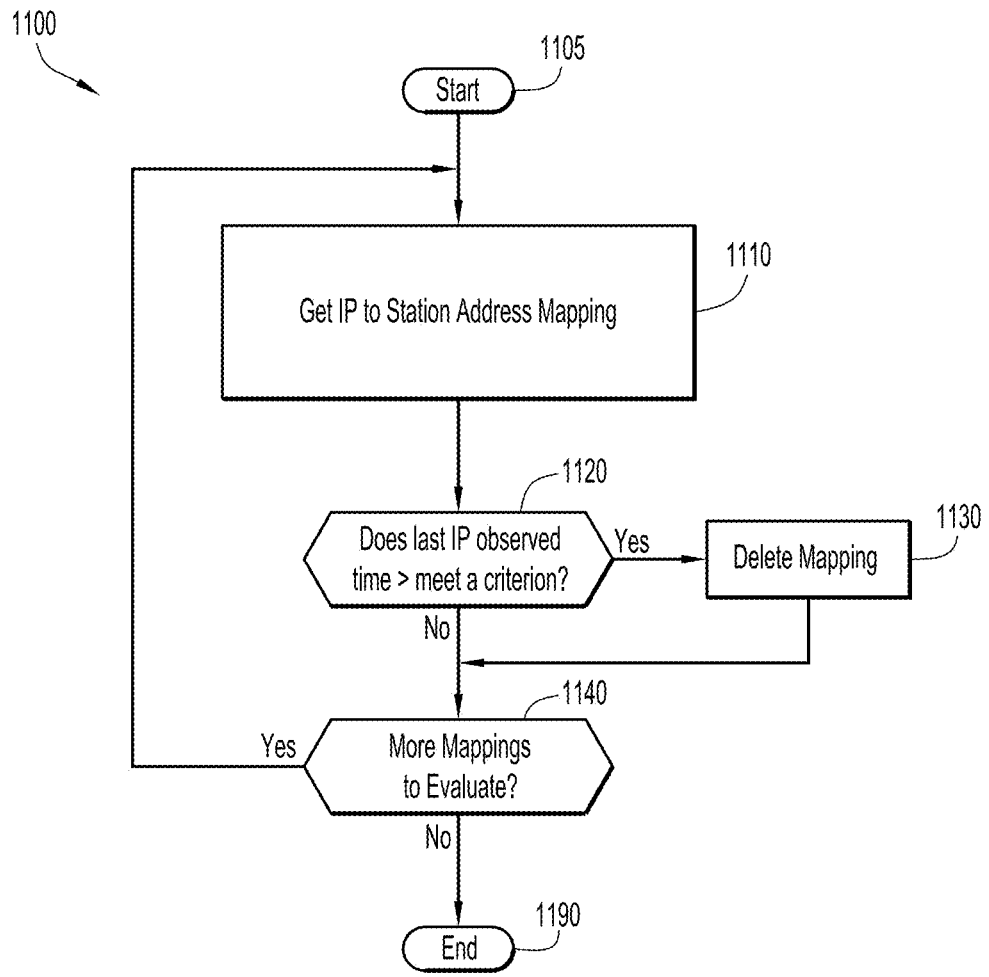
FIG. 11 is a flowchart of a method of maintaining a mapping of OTA station addresses to IP addresses by observing traffic referencing an IP address, according to an example embodiment.

FIG. 11 is a flowchart of an example method 1100 of maintaining a mapping of OTA station addresses to IP addresses by observing traffic referencing an IP address. For example, in some embodiments, the method 1100 discussed below with respect to FIG. 11 maintains a data structure analogous to the IP table 760, discussed above with respect to FIG. 7B. In some embodiments, one or more of the functions discussed below with respect to FIG. 11 and/or method 1100 are performed by hardware processing circuitry. For example, in some embodiments, instructions stored in a memory (e.g., memory element(s) 1904 discussed below) configure hardware processing circuitry (e.g., processor(s) 1902 discussed below) to perform one or more of the functions discussed below with respect to FIG. 11 and method 1100.

After start operation 1105, method 1100 moves to operation 1110. In operation 1110, an IP to station address mapping is obtained. For example, some embodiments of method 1100 iterate through a list of IP-to-station address mappings, such as an IP-to-station address mapping analogous to the IP-to-station address mapping maintained by the IP table 760, discussed above with respect to FIG. 7B.

In decision operation 1120, an evaluation of a most recent time the IP address and station address were referenced in the same message is made. The most recent time is evaluated against a criterion. For example, some embodiments compare the most recent time against a current time, and determine if an amount of time that has elapsed since the IP address was observed is above a threshold amount of time. In some embodiments, a variety of different types of network packets can update an observation time of an IP address. For example, some embodiments consider a most recent duplicate address detection protocol packet that referenced the IP address. In these embodiments, if no duplicate address detection (DAD) packets have been observed referencing the IP address within a predefined threshold period of time, then the method 1100 moves from decision operation 1120 to operation 1130, which deletes the mapping between the IP address and a station address. Other embodiments consider more than just DAD packet observations. For example, some embodiments consider any network messages that reference an IP address by the station address.

If the most recent observation time does not meet the criterion of decision operation 1120, method 1100 moves from decision operation 1120 to decision operation 1140, which determines if additional mappings need to be evaluated. If more mappings are available for evaluation, method 1100 moves from decision operation 1140 to operation 1110, where processing continues as described above. Otherwise, method 1100 moves from decision operation 1140 to end operation 1190.

Figure 12:
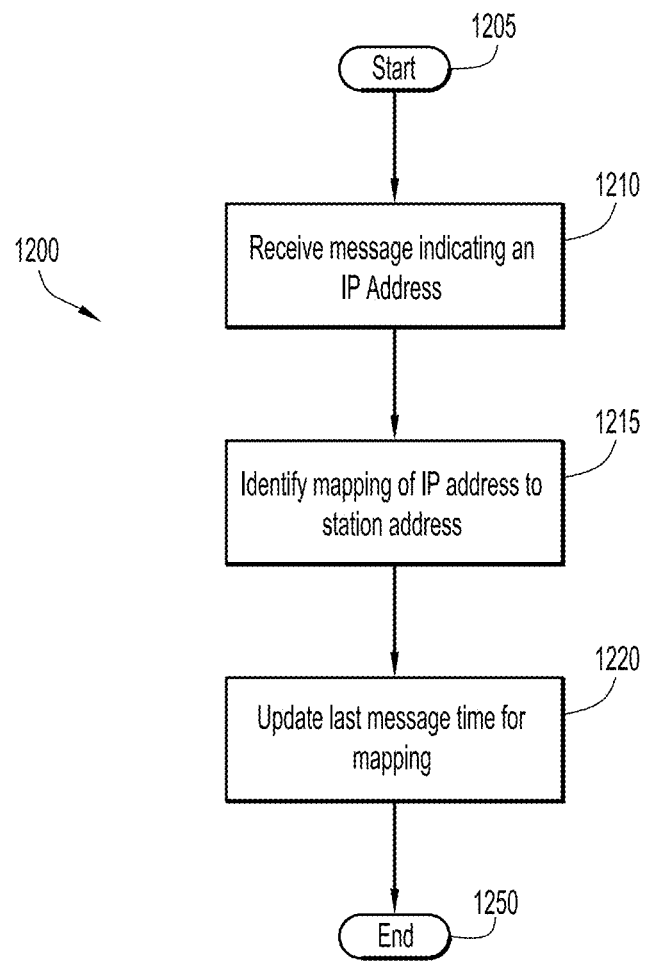
FIG. 12 is a flowchart of a method of maintaining activity information associated with an IP address, according to an example embodiment.

FIG. 12 is a flowchart of an example method 1200 of maintaining activity information associated with an IP address. For example, in some embodiments, the method 1200 discussed below with respect to FIG. 12 maintains a data structure analogous to the IP table 760, discussed above with respect to FIG. 7B. In some embodiments, one or more of the functions discussed below with respect to FIG. 12 and/or method 1200 are performed by hardware processing circuitry. For example, in some embodiments, instructions stored in a memory (e.g., memory element(s) 1904 discussed below) configure hardware processing circuitry (e.g., processor(s) 1902 discussed below) to perform one or more of the functions discussed below with respect to FIG. 12 and method 1200.

After start operation 1205, method 1200 moves to operation 1210. In operation 1210, a message is received that indicates an IP address. For example, the message indicates, in some embodiments, an IP address in a source IP address field or a destination IP address field of an IP header. In some embodiments, the received message is a DHCP message, and indicating an IP address in the DHCP message.

In operation 1215, a mapping between the IP address and a station address is identified. For example, in some embodiments, operation 1215 searches a data structure analogous to the IP table 760, discussed above with respect to FIG. 7B, and identifies an entry that indicates the IP address stored in the received message of operation 1210. In the example data structures of FIG. 7B, once such an entry is identified in the IP table 760, the unique STA identifier (e.g., via the STA identifier field 762) can be used to identify an entry in the STA table 750, which identifies an OTA address. Thus, in this example, operation 1215 is able to identify a mapping between the IP address (e.g., via the IP address field 764) and station address (e.g., via the OTA station address identifier field 756). Other embodiments implement different data structures to accomplish an analogous mapping, and those of FIG. 7B are simply examples for purposes of illustrating one possible approach.

In operation 1220, an update is made in the mapping to indicate the IP message was received by method 1200. For example, in some embodiments, operation 1220 updates a data structure analogous to the IP table 760 discussed above with respect to FIG. 7B to indicate reception of the message in operation 1210 (e.g., in various embodiments, a field analogous to the last observed time field 766 is updated to reflect a current or near-current time).

After operation 1220 completes, method 1200 moves to end operation 1250.

Figure 13:
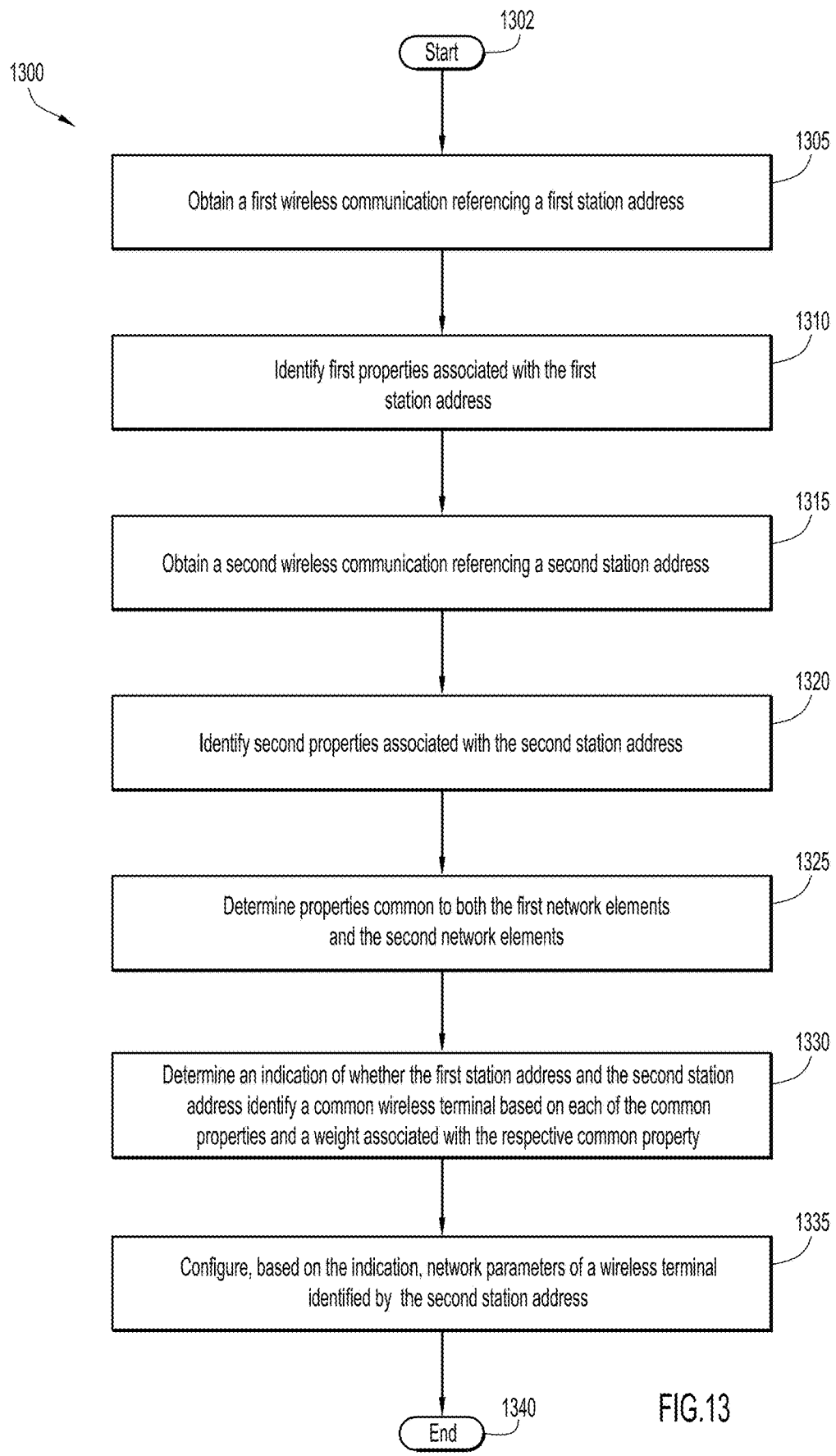
FIG. 13 is a flowchart of a method of configuring network parameters of a STA, according to an example embodiment.

FIG. 13 is a flowchart of an example method 1300 of configuring network parameters of a station. For example, as discussed above, in some embodiments, a station rotates or otherwise modifies its station address to improve the privacy of communications. While some solutions provide for the station to explicitly identify itself to wireless network infrastructure, at least some of the disclosed embodiments derive that two different station addresses represent a common station, without any requirement for the station to explicitly identify itself.

In some embodiments, one or more of the functions discussed below with respect to FIG. 13 and/or method 1300 are performed by hardware processing circuitry. For example, in some embodiments, instructions stored in a memory (e.g., memory element(s) 1904 discussed below) configure hardware processing circuitry (e.g., processor(s) 1902 discussed below) to perform one or more of the functions discussed below with respect to FIG. 13 and method 1300. In various embodiments, the method 1300 is performed by an AP or a WLC.

After start operation 1302, method 1300 moves to operation 1305. In operation 1305, a first wireless communication is obtained. The first wireless communication references a first station address. In some embodiments, operation 1305 obtains the first wireless communication by observing packets or messages that were transmitted by another device on a wireless medium. In some embodiments, the first wireless communication is obtained by receiving the communication via a wired connection (e.g., when a WLC receives a network message via a wired back-haul network). In at least some embodiments, the first station address is an OTA station address that identifies a particular STA or STA. In some embodiments, the first station address is a destination address of the first wireless communication (e.g., the first wireless communication is "going to" the particular STA or STA. In some embodiments, the first station address is a source address of the first wireless communication (e.g., the first wireless communication is transmitted by the particular STA or STA). The first wireless communication includes a single packet or in some embodiments, a plurality of packets, with each packet referencing the first station address. In some embodiments, the first wireless communication is comprised of one or more packets that reference the first station address as a source station address only, and do not include packets referencing the first station address as a destination station address.

In some embodiments, operation 1305 includes mapping the first station address to a first infrastructure station address. Operation 1305 also includes translating at least a portion of the first wireless communication from referencing the first station address (e.g., in a source address field of a MAC header) to instead referencing the first infrastructure station address. The translated portion is then forwarded to a destination address referenced by the portion (e.g., in a destination address field of the MAC header).

Operation 1310 identifies, based on the first wireless communication, first properties associated with the first station address. Thus, some embodiments of operation 1310 parse or otherwise decode one or more network messages packets included in the first wireless communication to identify properties referenced by the first wireless communication. The properties identified in operation 1310 include, in various embodiments, one or more of the property types discussed above. For example, operation 1310 identifies in some embodiments, one or more of information elements such as the Capability Information Element (in particular any one or more of, but not limited to, the ESS capability bit, the Privacy/WEP bit, the short preamble bit, the PBCC bit, the channel agility bit, the spectrum management bit, the short slot time bit, the uAPSD bit, the radio measurement support bit, and the delayed and immediate block ACK policy bits), supported rates element, the power capability element (e.g., the STA min/max power range), the supported channels list, the RM extended capability elements (in particular support information for link measurement, neighbor report, parallel measurement, repeated measurement, beacon passive measurement, beacon active measurement, beacon table measurement, beacon measurement reporting condition, frame measurement, channel load measurement, noise histogram measurement, statistics measurement, a LCI measurement, LCI azimuth capability, transmit stream/category measurement, triggered transmit stream/category measurement, AP channel report capability, RM MIB capability, operating channel max measurement duration value, non-operating channel max measurement duration value, measurement pilot capability, measurement pilot transmission information, neighbor report TSF offset, RCPI measurement capability, RSNI measurement capability, BSS average delay capability, BSS available capacity capability, antenna capability), the HT capability declarations (14 different parameters, including support for channel width, number of streams, and transmissions modes like delayed ACK, Tx STBC or RX STBC, DSS/CCK mode in 40 MHz, HT L-SIG protection support, or PSMP support), A-MPDU parameters (max A-MPDU length and density), the Rx supported MCS (12 different values), the HT extended capabilities (PC0 support, transition mode, MCS feedback capability, reverse direction transponder support), TxBF capabilities (20 different bits/functions), ASEL capabilities (8 different functions/bits), the Extended capabilities element (up to 10 different octets, thus up to 80 parameters), the VHT capability element (18 different elements, including SU beam forming support, MU beam forming support, TXOP PS support, VHT link adaptation supports, etc.), and/or the VHT supported Rx and Tx MCS (up to 31 values each). In some embodiments, a property is referenced by occupying a certain position within a message format. In some embodiments, a property is referenced by being explicitly labeled with an identifier of the property (e.g., a string name or numbered index label of the property) and also including a value of the identified property.

Note that the first properties decoded from the first wireless communications do not include any identifier a station intentionally provides for the purposes of uniquely identifying itself to wireless network infrastructure. Instead, properties represent parameters exchanged between a station and other network components for purposes other than explicitly identifying the station to the network infrastructure.

Operation 1315 obtains a second wireless communication referencing a second station address. In some embodiments, operation 1315 obtains the second wireless communication by observing packets or messages that were transmitted by another device on a wireless medium. In some embodiments, the second wireless communication is obtained by receiving the communication via a wired connection (e.g., when a WLC receives a network message via a wired back-haul network). In at least some embodiments, the second station address is an OTA station address that identifies a particular WT or STA. In some embodiments, the second station address is a destination address of the second wireless communication (e.g., the first wireless communication is "going to" the particular WT or STA). In some embodiments, the second station address is a source address of the second wireless communication (e.g., the first wireless communication is transmitted by the particular WT or STA). The second wireless communication includes a single packet or in some embodiments, a plurality of packets, with each packet referencing the second station address. In some embodiments, the second wireless communication is comprised of one or more packets that reference the second station address as a source station address only, and do not include packets referencing the second station address as a destination station address.

Operation 1320 identifies, based on the second wireless communication, second properties associated with the second station address. Thus, some embodiments of operation 1320 parse or otherwise decode one or more network messages or packets included in the second wireless communication to identify properties referenced by the second wireless communication. A property is referenced by a communication, in at least some embodiments, when it includes the property and indicates a value of the property. The properties identified in operation 1320 include, in various embodiments, one or more of the property types discussed above with respect to operation 1310. In some embodiments, a reference time of one or more of the identified properties is also recorded (e.g., in a field analogous to the reference time field 775C discussed above with respect to FIG. 7B).

Note that, similar to the first properties discussed above with respect to operation 1310, the second properties do not include Note that the first properties decoded from the first wireless communications do not include any identifier a station intentionally provides for the purposes of uniquely identifying itself to wireless network infrastructure. Instead, the second properties represent parameters exchanged between a station and other network components for purposes other than explicitly identifying the station to the network infrastructure.

Operation 1325 determines one or more properties that are common to the first properties and the second properties. Common properties are those referenced or present in both the first and second properties, and also property values in both the first and second are equivalent. Thus, such common properties are common as between the first properties and the second properties. Thus, for example, if both the first and second properties include an equivalent PMKID, the PMKID would be a common property (e.g. as discussed above). Similarly, in some embodiments, both the first wireless communication and the second wireless communication reference a common PMK name (e.g., R0 and/or R1). In some embodiments, both the first and second wireless communication reference a common IP address. Note that in some embodiments, properties common between the first and second wireless communications are filtered to include only those properties with respective reference times within a predefined elapsed time threshold. In some embodiments, the predefined elapsed time threshold is property specific.

Operation 1330 determines an indication of whether the first station address and the second station address identify a common station based on the one or more common properties and a weight associated with a respective common property. As discussed above, in some embodiments, properties are classified by type, with each property type associated with a weight and/or an indication of whether the property is an "override" property. For example, a pairwise master key property is allocated a pairwise master key type identifier in at least some embodiments. Thus, a pairwise master key value is stored, in some embodiments, by storing a pairwise master key type identifier (e.g., in the property type field 775A) along with the value (e.g., in the property value field 775B). Similarly, a pairwise master key identifier is allocated, in some embodiments a pairwise master key identifier type value that identifies a pairwise master key identifier property. The identifier type value is stored as a property of traffic referencing the PMKID (e.g., in the property type field 775A). In some embodiments, each property has its own type of classification, while in other embodiments, some property types include multiple different properties.

An override property is a property that, if common in traffic associated with two different OTA station addresses (e.g., two different OTA source station addresses), the override property functions as conclusive evidence that the two OTA station addresses represent a single physical device operating on the wireless network. Thus, if one or more of the common properties are override properties, operation 1330 determines that the two OTA station addresses represent a single device (e.g., an STA or WT). In some embodiments, one or more of a PMKID, PMK name are considered override properties. Some embodiments do not maintain a separate state as to whether a property is an override property or not, but instead simply assigns such properties a relatively higher weight. In some cases, the assigned weight is high enough as to have the practical effect of ensuring that if the property is found to be common across two sets of station address's traffic, sufficient similarity is sure to be found. Thus, regardless of whether an embodiment implements an explicit override indicator of a property, or simply uses a large weight value to effectively cause a property to be an override property, in some embodiments, one or more properties are configured to cause a determination that two OTA station addresses represent a common station if that property has a common value that is referenced by traffic indicating each of the two OTA station addresses.

In some embodiments, if none of the common properties are override properties, operation 1330 calculates a similarity score based on the common properties. As discussed above, some embodiments of a similarity score are a weighted sum of the common properties, where the weighted sum is determined by adding weights associated with each of the common properties. In some embodiments, a weight is assigned to each property based on the properties respective type (e.g., as illustrated above with respect to property type field 792 and the property weight field 796). In some embodiments, the similarity score represents a probability that the first station address and the second station address represent a common device. If the similarity score meets a criterion designed to identify common properties of sufficient similarity, operation 1330 determines the two station addresses represent or otherwise identify a single device. In some embodiments, a criterion is evaluated that compares the weighted sum to a predefined threshold, and if the weighted sum is greater than the predefined threshold, operation 1330 determines the first and second station addresses represent or identify a single device.

In operation 1335, one or more network parameters of a station (or an OTA station address) are configured based on whether the first station address and the second station address identify a common station or not. For example, as discussed above, a mapping between an OTA station address of a station or wireless terminal and an infrastructure address is determined, in at least some embodiments of operation 1335, based on whether the first and second station addresses represent or otherwise identify a common station. If the two station addresses do not represent a common device, each station address is mapped to a different infrastructure address. If the two station addresses do represent a common device, both station addresses are mapped to a common infrastructure address, at least under some circumstances (alternatively, the second station address replaces the first station address in a single mapping).

This mapping is then applied, for example, at a WLC. Inbound traffic having a destination address matching the infrastructure station address is modified to replace the infrastructure station address with a station address defined by the mapping. The traffic is then transmitted on a wireless network or forwarded to an AP (e.g., as the WLC 104 might forward inbound traffic it receives from the data network 106) to the AP 103A or the AP 103B). Similarly, outbound traffic specifying a station address as a source station address is modified to replace the source station address with the infrastructure address defined by the mapping, before the WLC forwards the traffic to a network (e.g., the data network 106) of FIG. 1A.

In some embodiments, operation 1335 determines both that the first and second station addresses represent a single device, and that the single device seeks to reuse an IP address with the second station address, when the IP address was previously used with the first station address. Thus, under these circumstances, method 1300 ensures that the IP address continues to be mapped to the first infrastructure address (e.g., first infrastructure station address 714A-B) that was previously mapped to the first station address. As discussed above with respect to FIG. 7A, in some circumstances, the IP address is mapped to a second infrastructure station address before method 1300 recognizes the need to maintain a mapping of the IP address to the first infrastructure address, and after the IP address was allocated to a second infrastructure station address (e.g., the second infrastructure station address 734 of FIG. 7A). Thus, in these circumstances, method 1300 releases the IP address association with the second infrastructure address (e.g., DHCP release message 740). This is accomplished, in some embodiments, via method 1300 generating a DHCP release message indicating release of the IP address, and sending the DHCP release message to a DHCP service (e.g., DHCP service 114 discussed above with respect to FIG. 1A and/or DHCP service 708 discussed above with respect to FIG. 7A). The method 1300 indicates the second infrastructure address in a source address field of the DHCP release message, at least in some embodiments. Method 1300 then reallocates the IP address to the first infrastructure address by transmitting a DHCP request (and/or discover) message indicating the IP address (e.g., DHCP request message 742). The DHCP request message is transmitted by indicating the first infrastructure station address in a source address field of the DHCP request message.

In some embodiments, a re-association message from a device identified via a first OTA station address causes operation 1335 to flush any existing mappings of the device to infrastructure addressees. For example, if a device has not been associated with an access point on a network for more than a predefined threshold period of time, there is no need to maintain or otherwise preserve any network state associated with that device. Thus, any prior mappings related to that device are flushed.

After operation 1335 completes, method 1300 moves to end operation 1340.

Figure 14:
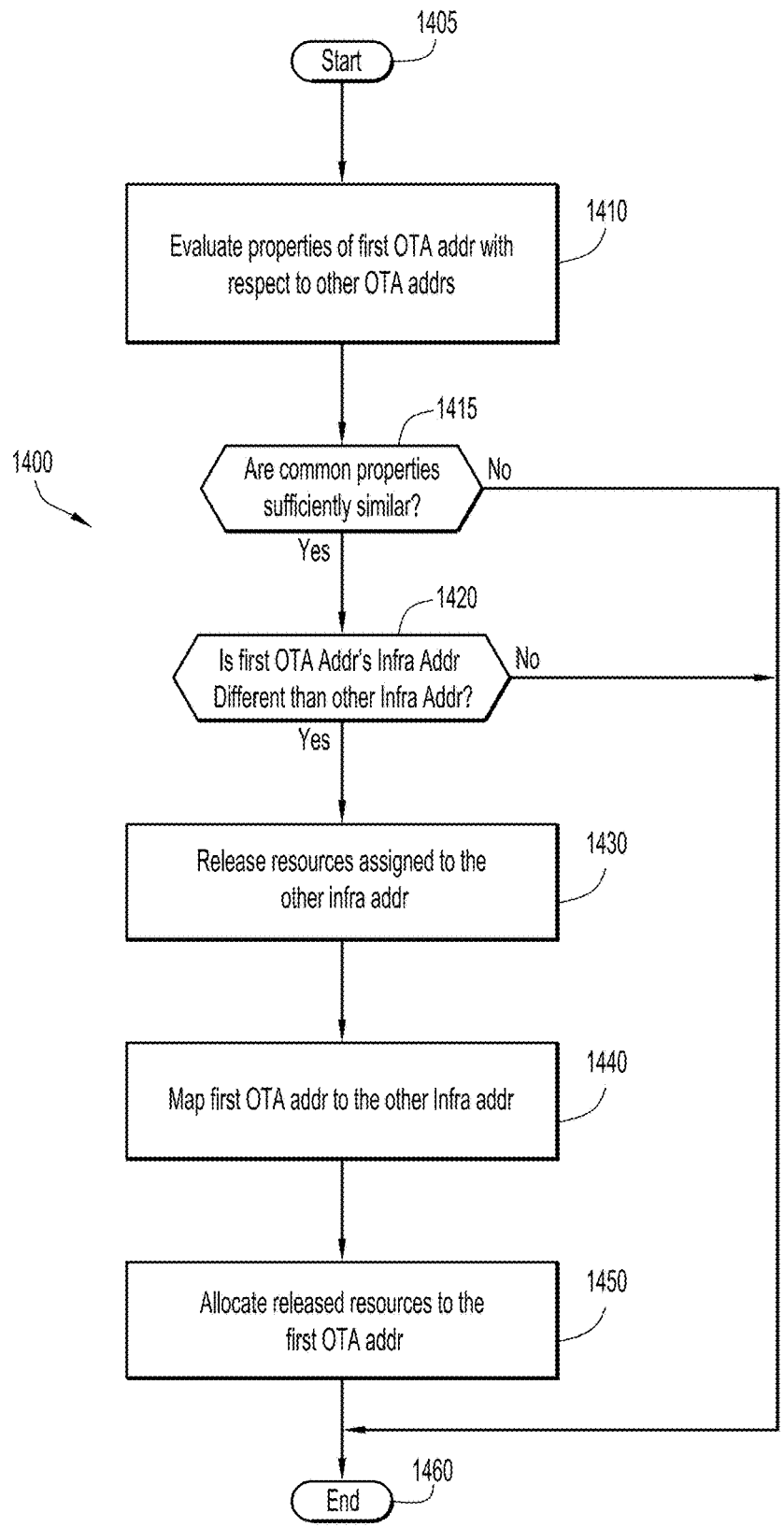
FIG. 14 is a flowchart of a method of determining a mapping from an OTA address to an infrastructure station address, according to an example embodiment.

FIG. 14 is a flowchart of an example method 1400 of determining a mapping from an OTA address to an infrastructure station address. For example, in some embodiments, the method 1400 discussed below with respect to FIG. 14 maintains a data structure analogous to the OTA address table 770, discussed above with respect to FIG. 7B, which provides a mapping from an OTA station address (e.g., identified by OTA station address field 774) to an infrastructure station address (e.g., identified via infrastructure address field 778). This mapping is used by a WLC to translate station addresses between wireless devices managed by the WLC and other devices accessible via a network. Thus, in some embodiments, the WLC maps outgoing packets having an OTA source station address to indicate the infrastructure station address as a source address. The WLC also maps incoming packets indicating the infrastructure station address in a destination address field to the appropriate OTA station address (based on the mapping). In some embodiments, one or more of the functions discussed below with respect to FIG. 14 and/or method 1400 are performed by hardware processing circuitry. For example, in some embodiments, instructions stored in a memory (e.g., memory element(s) 1904 discussed below) configure hardware processing circuitry (e.g., processor(s) 1902 discussed below) to perform one or more of the functions discussed below with respect to FIG. 14 and method 1400.

After start operation 1405, method 1400 moves to operation 1410. In operation 1410, properties of a first OTA address are evaluated with respect to other OTA addresses. For example, some embodiments maintain a set of properties exhibited by network messages (e.g., packets) referencing a particular OTA (station) address. An example of this is shown in FIG. 7B with the OTA address table 770. Thus, some embodiments of operation 1410 identify sets of properties exhibited by two different OTA station addresses to identify common properties. As discussed above, common properties can potentially include one or more of a PMK ID, a PMK name (e.g., R0 or R1), an IP address, one or more fields of an information element, or other properties.

Decision operation 1415 determines if the common properties between the first OTA address and another OTA address render the two addresses as sufficiently similar. As discussed above, some embodiments determine a weighted sum of common properties (e.g., via weights analogous to the weights stored in the property table 790 in some embodiments). Some embodiments also provide an ability to designate certain properties as "overwrite" properties. An override property indicates that if the property matches across two different OTA addresses, then conclusive evidence is provided that the two OTA addresses identify a common device. Thus, some embodiments of decision operation 1415 implement one or more of the techniques to determine whether the two OTA addresses are sufficiently similar. Sufficiently similar indicates, in some embodiments, that either an override property is common between the two OTA station addresses, or a similarity score generated based on the common properties (e.g., a weighted sum) meets a criterion designed to evaluate whether the two OTA addressees exhibit sufficient similarity (e.g. the criterion evaluates whether the similarity score is above a similarity threshold). If they are not sufficiently similar, method 1400 moves from decision operation 1415 to end operation 1460. If the two OTA addresses exhibit sufficient similarity, method 1400 moves from decision operation 1415 to decision operation 1420. Decision operation 1420 evaluates whether the first OTA address's infrastructure address is different than the known STA's infrastructure address. Thus, decision operation 1420 identifies an infrastructure address that is mapped to the first OTA address (e.g., via a data structure analogous to the OTA address table 770 in some embodiments). Decision operation 1420 also determines a second infrastructure address that is mapped to the other OTA address. These two infrastructure addresses are then compared to determine whether they are equivalent. If they are equivalent, method 1400 moves from decision operation 1420 to end operation 1460. If they are not equivalent, method 1400 moves from decision operation 1420 to operation 1430, which releases resources assigned to the first infrastructure address. In some embodiments, operation 1430 selectively releases only those resources assigned to the other infrastructure address and also exhibited to be in use by the first OTA address. In some embodiments, those resources allocated are based on common properties between the two OTA addresses. For example, if an IP address is common between the two OTA addresses, some embodiments derive from this information that the IP address needs to be released from the other OTA addresses so that it can be properly allocated to the first OTA address without potential duplicate IP address issues.

In operation 1440, the first OTA address is mapped to the other OTA's infrastructure address. Thus, if the other OTA address is mapped to a particular infrastructure address, the first OTA address is then mapped to the particular infrastructure address in operation 1440.

Operation 1450 allocates any resources released by operation 1430 to the first OTA address. Allocating the released resources in operation 1450 includes a variety of actions in various embodiments. For example, allocating an IP address to the first OTA address includes, in some embodiments, requesting the IP address be allocated to the first OTA address (or to the other infrastructure address) from a DHCP server.

After operation 1450 completes, method 1400 moves to end operation 1460.

Figure 15:
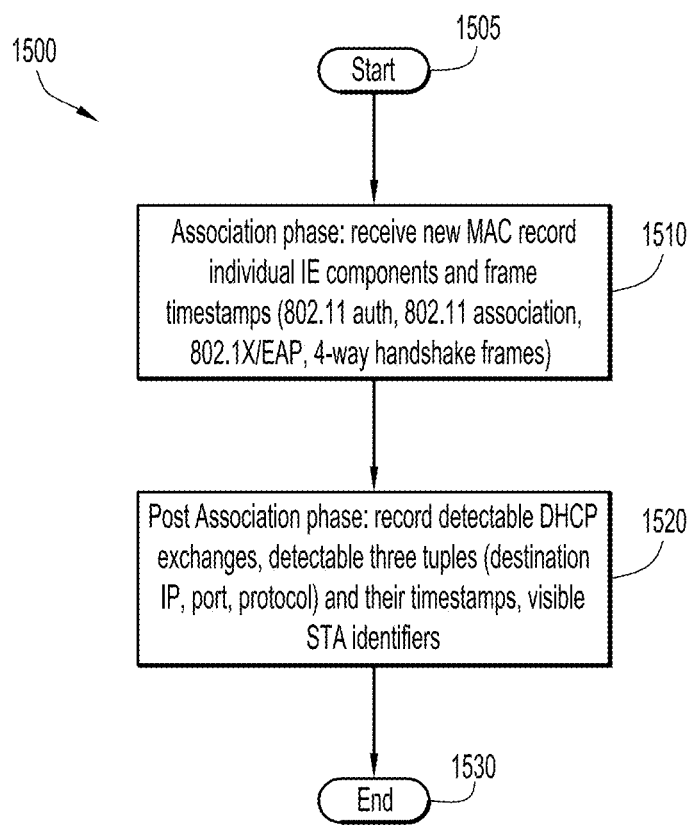
FIG. 15 is a flowchart of a method of identifying properties associated with an OTA station address, according to an example embodiment.

FIG. 15 is a flowchart of an example method 1500 of identifying properties associated with an OTA station address. For example, in some embodiments, the method 1500 discussed below with respect to FIG. 15 maintains a data structure analogous to the OTA address table 770, discussed above with respect to FIG. 7B, which provides a mapping from an OTA station address (e.g., identified by OTA station address field 774) to properties exhibited by a device using the OTA station address (e.g. via properties field 776 in some embodiments). These properties are utilized in some embodiments, to identify two different OTA station addresses that are associated with network messages exhibiting common properties. If the common properties meet certain conditions, some embodiments conclude that a single device is identified by both of the OTA addresses. This conclusion is then used to allocate or associate particular network resources with one or more of the addresses (e.g., such as a mapping of an OTA address to an infrastructure address, as discussed above).

In some embodiments, one or more of the functions discussed below with respect to FIG. 15 and/or method 1500 are performed by hardware processing circuitry. For example, in some embodiments, instructions stored in a memory (e.g., memory element(s) 1904 discussed below) configure hardware processing circuitry (e.g., processor(s) 1902 discussed below) to perform one or more of the functions discussed below with respect to FIG. 15 and method 1500.

After start operation 1505, method 1500 moves to operation 1510. Operation 1510 represents property identification that occurs during an association between a STA and an AP. Some embodiments analyze one or more messages transmitted during the association to identify properties exhibited by a device identified by an OTA address. For example, some embodiments maintain a data structure analogous to the OTA address table 770, discussed above with respect to FIG. 7B, which maps an OTA address (e.g., via OTA station address field 774) to one or more properties (e.g., via properties field 776).

Operation 1520 is performed after a device has associated with an access point. Further examination of one or more network messages associated with the OTA address identifies, for example, whether a device using the OTA address is re-using an IP address or other resources that it also used, in some embodiments, when identified via a different OTA address (e.g., previously). Some embodiments record destination IP addresses, ports, and protocols as properties exhibited by an OTA address.

After operation 1520 completes, method 1500 moves to end operation 1530.

Figure 16:
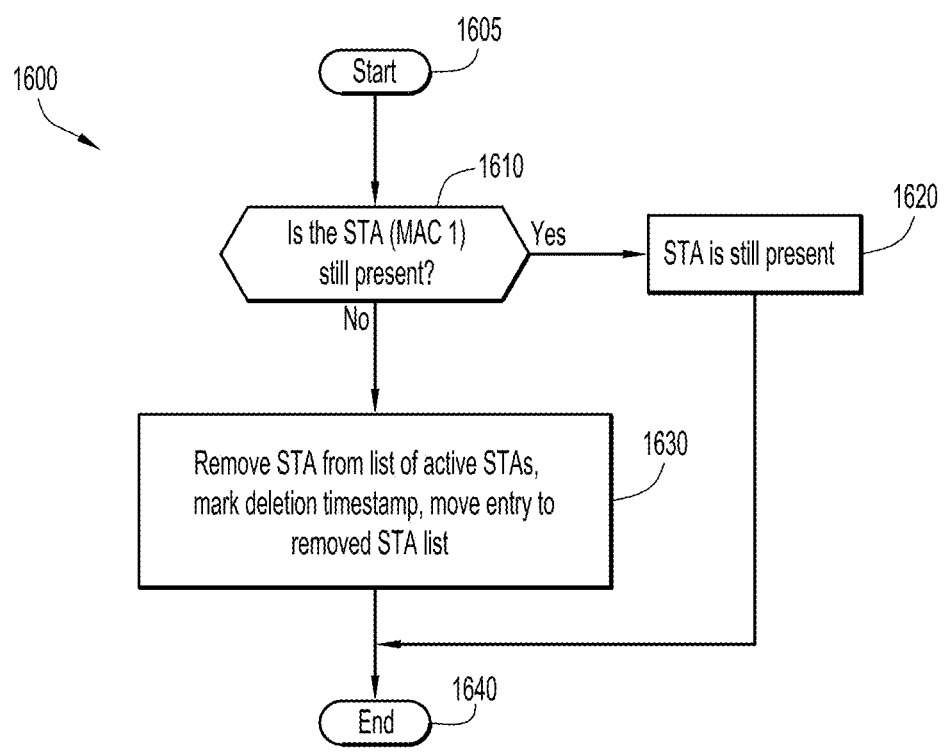
FIG. 16 is a flowchart of a method of tracking properties and/or activity of a station or wireless terminal, according to an example embodiment.

FIG. 16 is a flowchart of an example method 1600 of tracking properties and/or activity of a station or wireless terminal. For example, some embodiments maintain a data structure analogous to the STA table 750, discussed above with respect to FIG. 7B. The STA table 750 tracks a state of a particular STA with respect to processing of one or more of the disclosed embodiments. For example, as explained above, the STA table 750 tracks, in some embodiments (e.g., via the STA state field 754), whether an identified STA is active, potentially in the process of changing its OTA station address, or can be removed from processing consideration.

In some embodiments, one or more of the functions discussed below with respect to FIG. 16 and/or method 1600 are performed by hardware processing circuitry. For example, in some embodiments, instructions stored in a memory (e.g., memory element(s) 1904) configure hardware processing circuitry (e.g., processor(s) 1902) to perform one or more of the functions discussed below with respect to FIG. 16 and method 1600.

After start operation 1605, method 1600 moves to decision operation 1610. Decision operation 1610 determines whether a particular wireless station (or WT) is still present. Decision operation 1610 evaluates, in some embodiments, whether any network activity has been exhibited by the station within a predefined period of time. If decision operation 1610 determines the station or wireless terminal is still active on the network, method 1600 moves from decision operation 1610 to operation 1620, which determines the STA or wireless terminal is still active. Otherwise, method 1600 moves from decision operation 1610 to operation 1630. Operation 1630 removes the STA from a list of active STAs. Some embodiments record a time of the deletion and move the entry to a removed STA list. After either of operations 1620 or 1630 complete, method 1600 moves to end operation 1640.

Figure 17:
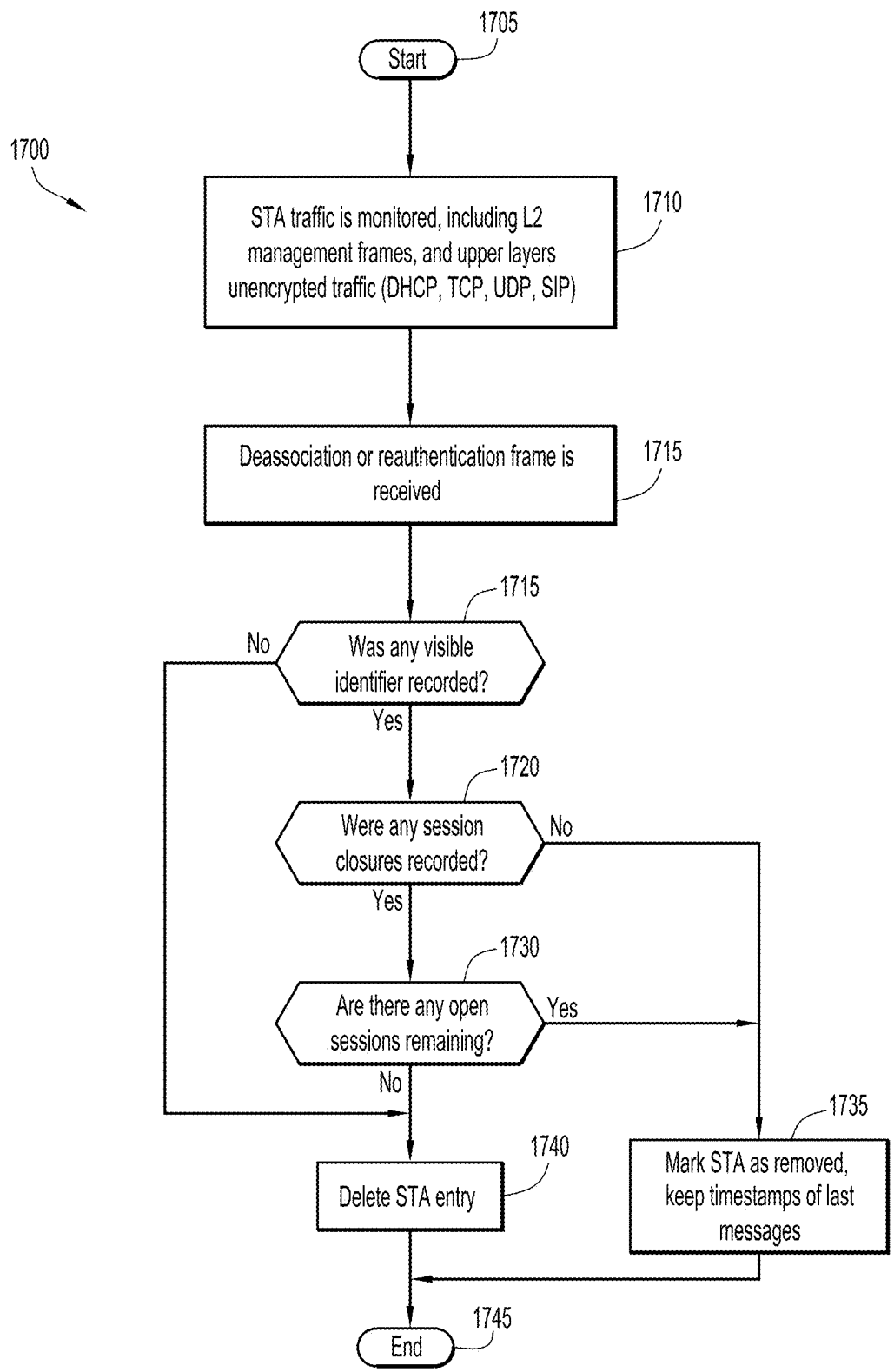
FIG. 17 is a flowchart of a method of tracking properties and/or activity of a station or wireless terminal, according to an example embodiment.

FIG. 17 is a flowchart of an example method 1700 of tracking properties and/or activity of a station or wireless terminal. For example, some embodiments maintain a data structure analogous to the STA table 750, discussed above with respect to FIG. 7B. The STA table 750 tracks a state of a particular STA with respect to processing of one or more of the disclosed embodiments. For example, as explained above, the STA table 750 tracks, in some embodiments (e.g., via the STA state field 754), whether an identified STA is active, potentially in the process of changing its OTA station address, or can be removed from processing consideration.

In some embodiments, one or more of the functions discussed below with respect to FIG. 17 and/or method 1700 are performed by hardware processing circuitry. For example, in some embodiments, instructions stored in a memory (e.g., memory element(s) 1904 discussed below) configure hardware processing circuitry (e.g., processor(s) 1902) to perform one or more of the functions discussed below with respect to FIG. 17 and method 1700.

After start operation 1705, method 1700 moves to operation 1710. In operation 1710, traffic from a station or wireless terminal is monitored. The monitoring includes level two management frames, as well as upper layer frames that are not encrypted. This can include, for example, DHCP, transmission control protocol (TCP) traffic, user datagram protocol (UDP), and/or serial over IP (SIP) traffic. One or more properties are extracted from the monitored traffic. The properties are stored in a data structure analogous to the OTA address table 770, discussed above with respect to FIG. 7B.

In operation 1710, a de-association or re-authentication frame is received. The received frame is decoded to support determination in one or more of decision operation 1715, 1720, or 1730 discussed below.

Decision operation 1715 determines whether any visible identifier was recorded. A visible identifier includes, in some embodiments, one or more of an outer significant 802.1X/EAP, DHCP hostname, an application user identity, or other visible identifier. If no visible identifier was recorded, method 1700 moves from decision operation 1715 to operation 1740, discussed below. Otherwise, method 1700 moves to decision operation 1720, which evaluates whether any session closures were recorded. Examples of session closers include, for example, a DHCP release, a TCP fin packet, a SIP termination, or other indications of a session closure. If no session closers were recorded, method 1700 moves from decision operation 1720 to operation 1735, discussed below.

If session closures were recorded, method 1700 moves from decision operation 1720 to decision operation 1730, which evaluates if there are any open sessions that remain open. If there are sessions remaining open, method 1700 moves from decision operation 1730 to operation 1735. Operation 1735 marks the STA as removed, but maintains timestamps of most recent message(s) exchanged with the STA. After operation 1735, method 1700 moves to end operation 1750.

Operation 1740 deletes a STA entry. After operation 1740 completes, method 1700 moves to end operation 1750.

Figure 18:
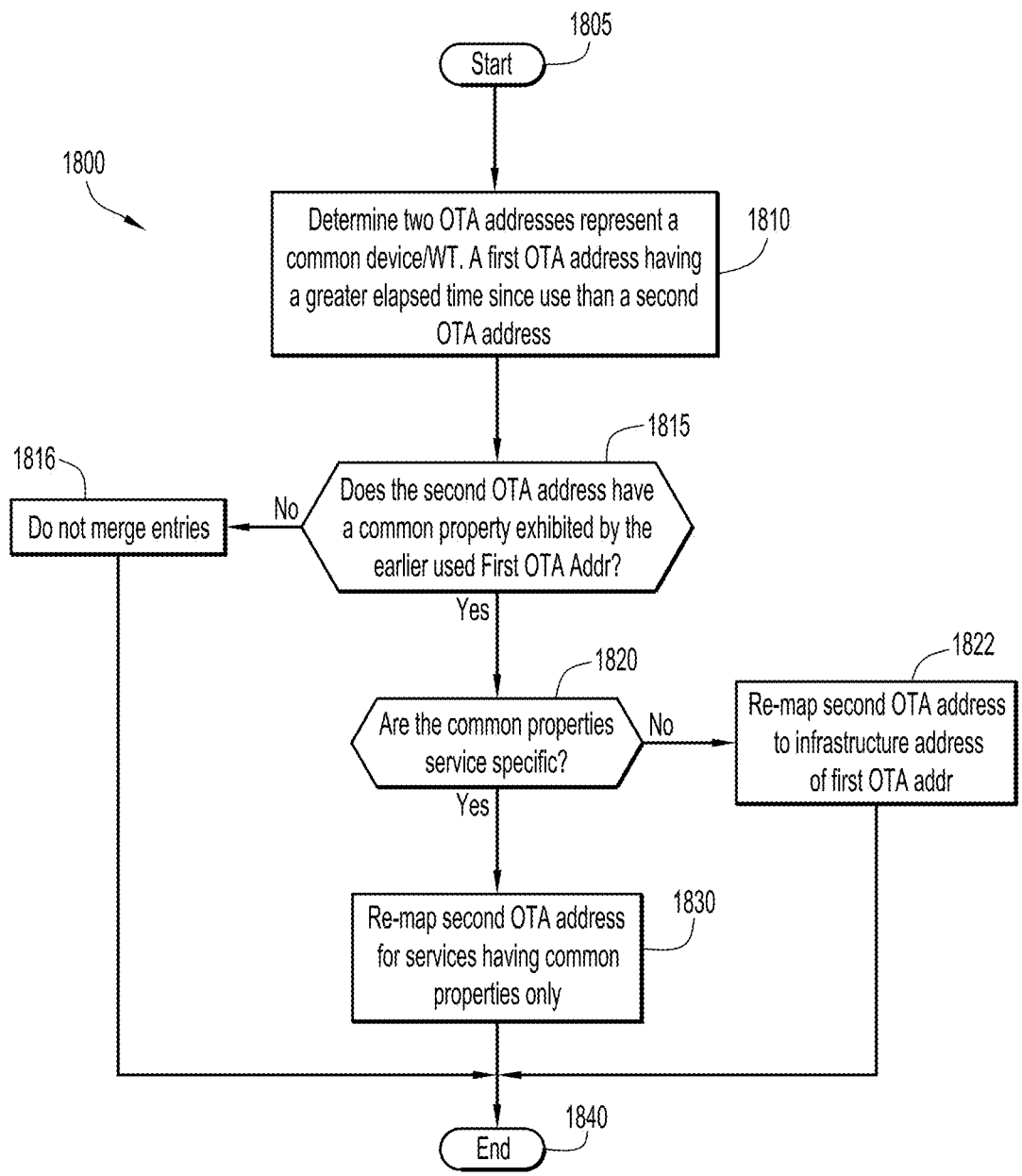
FIG. 18 is a flowchart of a method of selectively remapping an infrastructure station address to an OTA address, according to an example embodiment.

FIG. 18 is a flowchart of an example method 1800 of selectively remapping an infrastructure station address to an OTA address. For example, as discussed above, a WLC maps between an OTA address used on a wireless network to identify a device, such as a station or wireless terminal, and an infrastructure station address that identifies the station or wireless terminal to devices outside the wireless network. Thus, the WLC maps packets inbound to the wireless network, which identify the station via the infrastructure address, and replaces the infrastructure address with the OTA address of the STA, and then transmits the inbound packet on the wireless network. Similarly, the WLC receives, either directly or via an AP, an outbound packet destined for a device outside the wireless network. The WLC replaces the station or wireless terminals OTA address in the packet with its infrastructure address, and forwards the packet onto the wired network. When a station or wireless terminal modifies its OTA address, there is, in some cases, a need to map one or more addresses in use by the station (such as an IP address or other identification) to the station's previous infrastructure address, which identifies the station to devices outside the wireless network.

In some embodiments, one or more of the functions discussed below with respect to FIG. 18 and/or method 1800 are performed by hardware processing circuitry. For example, in some embodiments, instructions stored in a memory (e.g., memory element(s) 1904 discussed below) configure hardware processing circuitry (e.g., processor(s) 1902 discussed below) to perform one or more of the functions discussed below with respect to FIG. 18 and method 1800.

After start operation 1805, method 1800 moves to operation 1810. Operation 1810 determines that two OTA addresses represent or identify a common device (e.g., a STA/WT). A first OTA address of the two OTA addresses has a greater elapsed time since use than a second OTA address (e.g., the first OTA address is the older address, which may no longer be in use by the common device.

Decision operation 1815 determines whether the second OTA address has exhibited a property that is common to properties exhibited by the first OTA address. If there are no common properties, method 1800 moves from decision operation 1815 to operation 1816, which concludes that information relating to the two different OTA addresses do not need to be integrated (e.g., an infrastructure station address associated with the first OTA address does not need to be remapped to the second OTA address). After operation 1816, method 1800 moves to end operation 1840.

If decision operation 1815 determines that common properties are exhibited by the two OTA addresses, method 1800 moves from decision operation 1815 to decision operation 1820. Decision operation 1820 determines whether any of the common properties are service specific properties. For example, as discussed above with respect to the property table 790, some embodiments provide for indications that certain properties exhibited by an OTA station address are specific to particular services. Thus, if an OTA address of a device is modified, special actions are needed, in some cases, to adapt the service to the new OTA address. Examples of service specific properties include, for example, encryption keys used to communicate with a particular service, or source port/destination port numbers, session identifiers, or other session type information particular to a service. If at least one of the properties is service specific, method 1800 moves from decision operation 1820 to operation 1830, where the second OTA address is remapped for services having the common properties.

If none of the common properties are service specific, method 1800 moves from decision operation 1820 to operation 1822, where the second (more recently used) OTA address is remapped to an infrastructure address previously mapped to the first OTA address. After either the operation 1822 or the operation 1830 completes, method 1800 moves to end operation 1840.

Figure 19:
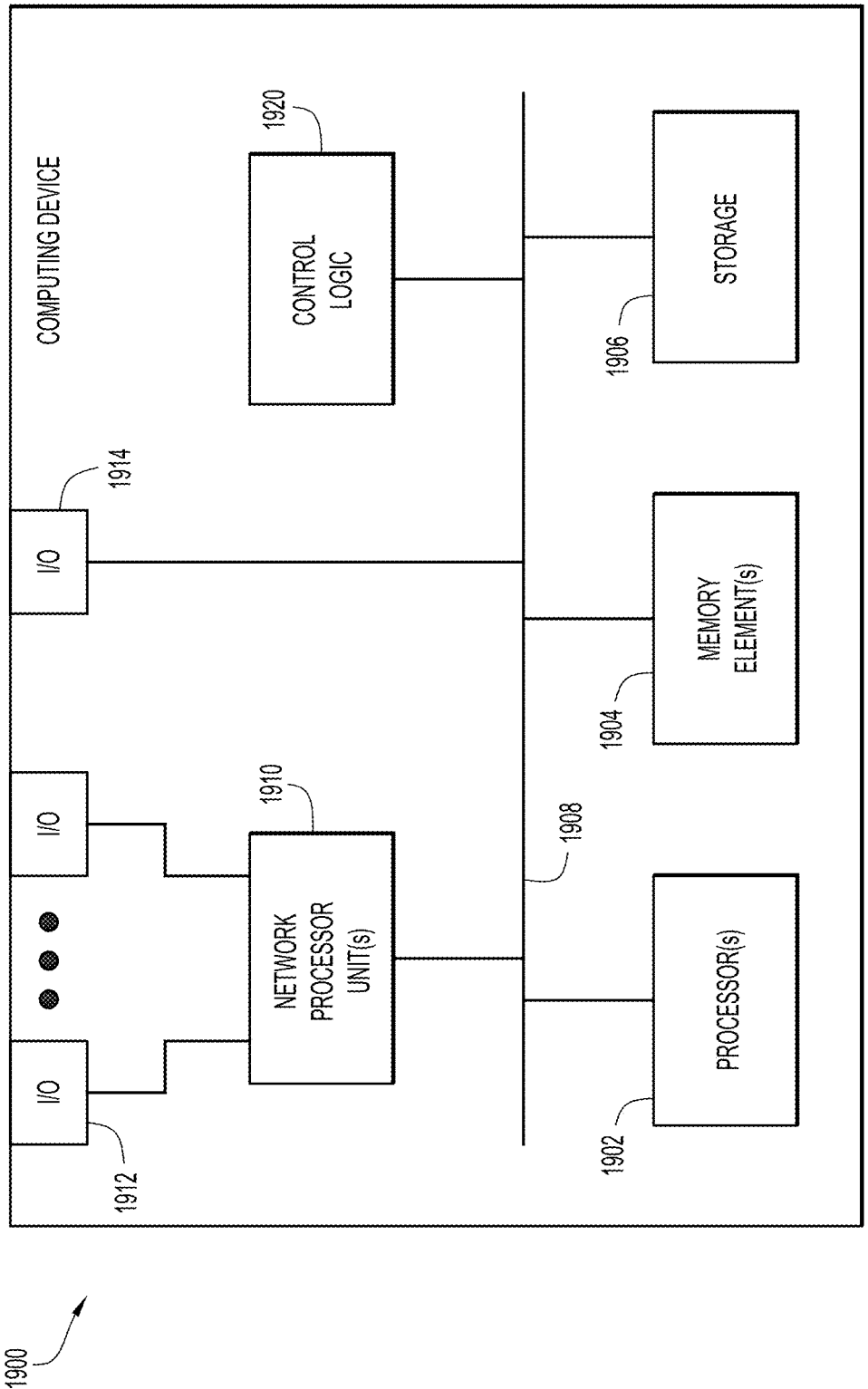
FIG. 19 is a hardware block diagram of an example computing/computer device that perform, in some embodiments, functions associated with operations discussed herein in connection with the techniques depicted in any one or more of FIGS. 8-18.

FIG. 19 is a hardware block diagram of a device 1900 that may perform functions associated with operations discussed herein in connection with the techniques depicted in any one or more of FIGS. 8-18. In various embodiments, any of the devices discussed above (e.g., an AP, WLC, or other device.) implement a computing architecture analogous to that described below with respect to the device 1900.

In at least one embodiment, the device 1900 may include one or more processor(s) 1902, one or more memory element(s) 1904, storage 1906, a bus 1908, one or more network processor unit(s) 1910 interconnected with one or more network input/output (I/O) interface(s) 1912, one or more I/O interface(s) 1914, and control logic 1920. In various embodiments, instructions associated with logic for device 1900 can overlap in any manner and are not limited to the specific allocation of instructions and/or operations described herein.

In at least one embodiment, processor(s) 1902 is/are at least one hardware processor configured to execute various tasks, operations and/or functions for device 1900 as described herein according to software and/or instructions configured for device 1900. Processor(s) 1902 (e.g., a hardware processor) can execute any type of instructions associated with data to achieve the operations detailed herein. In one example, processor(s) 1902 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 1904 and/or storage 1906 is/are configured to store data, information, software, and/or instructions associated with device 1900, and/or logic configured for memory element(s) 1904 and/or storage 1906. For example, any logic described herein (e.g., control logic 1920) can, in various embodiments, be stored for device 1900 using any combination of memory element(s) 1904 and/or storage 1906. Note that in some embodiments, storage 1906 can be consolidated with memory element(s) 1904 (or vice versa), or can overlap/exist in any other suitable manner.

In at least one embodiment, bus 1908 can be configured as an interface that enables one or more elements of device 1900 to communicate in order to exchange information and/or data. Bus 1908 can be implemented with any architecture designed for passing control, data and/or information between processors, memory elements/storage, peripheral devices, and/or any other hardware and/or software components that may be configured for device 1900. In at least one embodiment, bus 1908 may be implemented as a fast kernel-hosted interconnect, potentially using shared memory between processes (e.g., logic), which can enable efficient communication paths between the processes.

In various embodiments, network processor unit(s) 1910 may enable communication between device 1900 and other systems, devices, or entities, via network I/O interface(s) 1912 (wired and/or wireless) to facilitate operations discussed for various embodiments described herein. In various embodiments, network processor unit(s) 1910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 1900 and other systems, devices, or entities to facilitate operations for various embodiments described herein. In various embodiments, network I/O interface(s) 1912 can be configured as one or more Ethernet port(s), Fibre Channel ports, any other I/O port(s), and/or antenna(s)/antenna array(s) now known or hereafter developed. Thus, the network processor unit(s) 1910 and/or network I/O interface(s) 1912 may include suitable interfaces for receiving, transmitting, and/or otherwise communicating data and/or information in a network environment.

I/O interface(s) 1914 allow for input and output of data and/or information with other entities that may be connected to device 1900. For example, I/O interface(s) 1914 may provide a connection to external devices such as a keyboard, keypad, a touch screen, and/or any other suitable input and/or output device now known or hereafter developed. This may be the case, in particular, when the device 1900 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 1900 serves as a user device as described herein.

In various embodiments, control logic 1920 can include instructions that, when executed, cause the processor(s) 1902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1904 and/or storage 1906 can store data, software, code, instructions (e.g., processor instructions), logic, parameters, combinations thereof, and/or the like used for operations described herein. This includes memory element(s) 1904 and/or storage 1906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, Institute of Electrical and Electronics Engineers (IEEE) 802.11 (e.g., Wi-Fi®/Wi-Fi6®), IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining a first wireless communication referencing a first station address;
    identifying first properties for first packets associated with the first wireless communication that are associated with the first station address;
    obtaining a second wireless communication referencing a second station address;
    identifying second properties for second packets associated with the second wireless communication that are associated with the second station address;
    determining one or more common properties between the first properties and the second properties;
    determining that the first station address and the second station address identify a common station based on the one or more common properties and a weight associated with a respective common property, wherein an Internet Protocol (IP) address is included in both the first properties and the second properties; and
    configuring network parameters of a station identified by the second station address, wherein configuring the network parameters of the station comprises mapping the second station address to an IP address for a first infrastructure station address by issuing a Dynamic Host Configuration Protocol (DHCP) release of an IP address for a second infrastructure station address and issuing a DHCP discover message or a DHCP request message indicating the IP address for the first infrastructure station address in response to the DHCP release to reallocate the IP address to the first infrastructure station address.

2. The method of claim 1, further comprising determining respective reference times of each of the first properties and the second properties, wherein determining that the first station address and the second station address identify the common station is further based on the respective reference times.

3. The method of claim 1, further comprising:
    classifying a type of each of the one or more common properties; and
    determining the weight associated with each of the one or more common properties based on the type.

4. The method of claim 1, wherein configuring of the network parameters of the station further comprises mapping the second station address to the first infrastructure station address.

5. The method of claim 4, further comprising:
    translating a header field of the second packets of the second wireless communication from the second station address to the first infrastructure station address; and
    forwarding the second packets of the second wireless communication to a destination address referenced in another header field of the second packets of the second wireless communication.

6. The method of claim 4, wherein the mapping comprises using a weight associated with a pairwise master key identifier type to map the second station address to the first infrastructure station address.

7. The method of claim 6, wherein the mapping comprises using the weight associated with the pairwise master key identifier type to map the second station address to the first infrastructure station address in response to a four-way handshake that is based on a pairwise master key value, the pairwise master key value being common to both the first wireless communication and the second wireless communication.

8. A non-transitory computer readable storage medium comprising instructions that when executed configure hardware processing circuitry to perform operations comprising:

obtaining a first wireless communication referencing a first station address;

identifying first properties for first packets associated with the first wireless communication that are associated with the first station address;

obtaining a second wireless communication referencing a second station address;

identifying second properties for second packets associated with the second wireless communication that are associated with the second station address;

determining one or more common properties between the first properties and the second properties;

determining that the first station address and the second station address identify a common station based on the one or more common properties and a weight associated with a respective common property, wherein an Internet Protocol (IP) address is included in both the first properties and the second properties; and configuring network parameters of a station identified by the second station address, wherein configuring the network parameters of the station comprises mapping the second station address to an IP address for a first infrastructure station address by issuing a Dynamic Host Configuration Protocol (DHCP) release of an IP address for a second infrastructure station address and issuing a DHCP discover message or a DHCP request message indicating the IP address for the first infrastructure station address in response to the DHCP release to reallocate the IP address to the first infrastructure station address.

9. The non-transitory computer readable storage medium of claim 8, the operations further comprising determining respective reference times of each of the first properties and the second properties, wherein determining that the first station address and the second station address identify the common station is further based on the respective reference times.

10. The non-transitory computer readable storage medium of claim 8, the operations further comprising:
classifying a type of each of the one or more common properties; and
determining the weight associated with each of the one or more common properties based on the type.

11. The non-transitory computer readable storage medium of claim 8, wherein configuring of the network parameters of the station further comprises mapping the second station address to the first infrastructure station address.

12. The non-transitory computer readable storage medium of claim 11, the operations further comprising:
translating a header field of the second packets of the second wireless communication from the second station address to the first infrastructure station address; and
forwarding the second packets of the first wireless communication to a destination address referenced in another header field of the second packets of the second wireless communication.

13. The non-transitory computer readable storage medium of claim 11, wherein the mapping comprises using a weight associated with a pairwise master key identifier type to map the second station address to the first infrastructure station address.

14. An apparatus comprising:
a network interface configured to enable network communications; and
a processor coupled to the network interface, the processor configured to perform operations comprising:

obtaining a first wireless communication referencing a first station address;

identifying first properties for first packets associated with the first wireless communication that are associated with the first station address;

obtaining a second wireless communication referencing a second station address;

identifying second properties for second packets associated with the second wireless communication that are associated with the second station address;

determining one or more common properties between the first properties and the second properties;

determining that the first station address and the second station address identify a common station based on the one or more common properties and a weight associated with a respective common property, wherein an Internet Protocol (IP) address is included in both the first properties and the second properties; and configuring network parameters of a station identified by the second station address, wherein configuring the network parameters of the station comprises mapping the second station address to an IP address for a first infrastructure station address by issuing a Dynamic Host Configuration Protocol (DHCP) release of an IP address for a second infrastructure station address and issuing a DHCP discover message or a DHCP request message indicating the IP address for the first infrastructure station address in response to the DHCP release to reallocate the IP address to the first infrastructure station address.

15. The apparatus of claim 14, wherein the operations further comprise determining respective reference times of each of the first properties and the second properties, wherein determining that the first station address and the second station address identify the common station is further based on the respective reference times.

16. The apparatus of claim 14, wherein the operations further comprise:
classifying a type of each of the one or more common properties; and
determining the weight associated with each of the one or more common properties based on the type.

17. The apparatus of claim 14, wherein configuring of the network parameters of the station further comprises mapping the second station address to the first infrastructure station address.

18. The apparatus of claim 17, wherein the operations further comprise:
translating a header field of the second packets of the second wireless communication from the second station address to the first infrastructure station address; and
forwarding the second packets of the second wireless communication to a destination address referenced in another header field of the second packets of the second wireless communication.

19. The apparatus of claim 17, wherein the mapping comprises using a weight associated with a pairwise master key identifier type to map the second station address to the first infrastructure station address.

20. The apparatus of claim 19, wherein the mapping comprises using the weight associated with the pairwise master key identifier type to map the second station address to the first infrastructure station address in response to a four-way handshake that is based on a pairwise master key value, the pairwise master key value being common to both the first wireless communication and the second wireless communication.

\* \* \* \* \*

UNITED STATES PATENT AND TRADEMARK OFFICE
CERTIFICATE OF CORRECTION

| | | |
|---|---|---|
| PATENT NO. | : 11,849,344 B2 | Page 1 of 1 |
| APPLICATION NO. | : 17/236659 | |
| DATED | : December 19, 2023 | |
| INVENTOR(S) | : Jerome Henry et al. | |

It is certified that error appears in the above-identified patent and that said Letters Patent is hereby corrected as shown below:

On the Title Page

Above item (54), please delete the letter "Z".

Signed and Sealed this
Fifteenth Day of October, 2024

Katherine Kelly Vidal
*Director of the United States Patent and Trademark Office*